(12) United States Patent
Moore et al.

(10) Patent No.: US 11,496,497 B2
(45) Date of Patent: *Nov. 8, 2022

(54) PROTECTING NETWORKS FROM CYBER ATTACKS AND OVERLOADING

(71) Applicant: Centripetal Networks, Inc., Portsmouth, NH (US)

(72) Inventors: Sean Moore, Hollis, NH (US); Steven Rogers, Leesburg, VA (US); John Daniel Scoggins, Sr., Leesburg, VA (US)

(73) Assignee: Centripetal Networks, Inc., Portsmouth, NH (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/089,911

(22) Filed: Nov. 5, 2020

(65) Prior Publication Data

US 2021/0176265 A1    Jun. 10, 2021

Related U.S. Application Data

(63) Continuation of application No. 14/745,207, filed on Jun. 19, 2015, now Pat. No. 10,862,909, which is a
(Continued)

(51) Int. Cl.
*H04L 9/40* (2022.01)
*H04L 47/11* (2022.01)

(52) U.S. Cl.
CPC .......... *H04L 63/1425* (2013.01); *H04L 47/11* (2013.01); *H04L 63/0227* (2013.01);
(Continued)

(58) Field of Classification Search
CPC . H04L 63/0236; H04L 63/0263; H04L 63/14; H04L 63/1408; H04L 63/1416;
(Continued)

(56) References Cited

U.S. PATENT DOCUMENTS 6,098,172 A    8/2000   Coss et al.
6,147,976 A    11/2000  Shand et al.
(Continued)

FOREIGN PATENT DOCUMENTS

AU    2005328336 B2    9/2011
AU    2006230171 B2    6/2012
(Continued)

OTHER PUBLICATIONS

Greenwald, M., "Designing an Academic Firewall: Policy, Practice, and Experience with SURF", IEEE, Proceedings of SNDSS (Year: 1996).*
(Continued)

*Primary Examiner* — Daniel B Potratz
(74) *Attorney, Agent, or Firm* — Banner & Witcoff, Ltd.

(57) ABSTRACT

Packets may be received by a packet security gateway. Responsive to a determination that an overload condition has occurred in one or more networks associated with the packet security gateway, a first group of packet filtering rules may be applied to at least some of the packets. Applying the first group of packet filtering rules may include allowing at least a first portion of the packets to continue toward their respective destinations. Responsive to a determination that the overload condition has been mitigated, a second group of packet filtering rules may be applied to at least some of the packets. Applying the second group of packet filtering rules may include allowing at least a second portion of the packets to continue toward their respective destinations.

27 Claims, 8 Drawing Sheets

Related U.S. Application Data continuation of application No. 13/838,471, filed on Mar. 15, 2013, now Pat. No. 9,094,445.

(52) U.S. Cl.
CPC ...... *H04L 63/0236* (2013.01); *H04L 63/0263* (2013.01); *H04L 63/14* (2013.01); *H04L 63/1408* (2013.01); *H04L 63/1441* (2013.01); *H04L 63/1458* (2013.01)

(58) Field of Classification Search
CPC ............. H04L 63/1425; H04L 63/1458; H04L 29/06551; H04L 29/06578–06591; H04L 29/06877–06897; H04L 29/06911; H04L 29/06925; H04L 47/11
See application file for complete search history.

(56) References Cited

U.S. PATENT DOCUMENTS

| | | |
|---|---|---|
| 6,226,372 B1 | 5/2001 | Beebe et al. |
| 6,279,113 B1 | 8/2001 | Vaidya |
| 6,317,837 B1 | 11/2001 | Kenworthy |
| 6,484,261 B1 | 11/2002 | Wiegel |
| 6,611,875 B1 | 8/2003 | Chopra et al. |
| 6,662,235 B1 | 12/2003 | Callis et al. |
| 6,678,827 B1 | 1/2004 | Rothermel et al. |
| 6,826,694 B1 | 11/2004 | Dutta et al. |
| 6,907,042 B1 | 6/2005 | Oguchi |
| 6,971,028 B1 | 11/2005 | Lyle et al. |
| 7,089,581 B1 | 8/2006 | Nagai et al. |
| 7,095,716 B1 | 8/2006 | Ke et al. |
| 7,107,613 B1 | 9/2006 | Chen et al. |
| 7,143,438 B1 | 11/2006 | Coss et al. |
| 7,152,240 B1 | 12/2006 | Green et al. |
| 7,185,368 B2 | 2/2007 | Copeland, III |
| 7,215,637 B1 | 5/2007 | Ferguson et al. |
| 7,225,269 B2 | 5/2007 | Watanabe |
| 7,227,842 B1 | 6/2007 | Ji et al. |
| 7,237,267 B2 | 6/2007 | Rayes et al. |
| 7,263,099 B1 | 8/2007 | Woo et al. |
| 7,296,288 B1 | 11/2007 | Hill et al. |
| 7,299,353 B2 | 11/2007 | Le Pennec et al. |
| 7,331,061 B1 | 2/2008 | Ramsey et al. |
| 7,478,429 B2* | 1/2009 | Lyon ........................ H04L 65/80 726/22 |
| 7,499,412 B2 | 3/2009 | Matityahu et al. |
| 7,539,186 B2 | 5/2009 | Aerrabotu et al. |
| 7,610,621 B2 | 10/2009 | Turley et al. |
| 7,684,400 B2 | 3/2010 | Govindarajan et al. |
| 7,710,885 B2* | 5/2010 | Ilnicki ...................... H04L 43/00 370/254 |
| 7,721,084 B2 | 5/2010 | Salminen et al. |
| 7,792,775 B2 | 9/2010 | Matsuda |
| 7,814,158 B2 | 10/2010 | Malik |
| 7,814,546 B1 | 10/2010 | Strayer et al. |
| 7,818,794 B2* | 10/2010 | Wittman ................ G06F 21/554 726/13 |
| 7,849,502 B1 | 12/2010 | Bloch et al. |
| 7,913,303 B1 | 3/2011 | Rouland et al. |
| 7,954,143 B2 | 5/2011 | Aaron |
| 8,004,994 B1 | 8/2011 | Darisi et al. |
| 8,009,566 B2 | 8/2011 | Zuk et al. |
| 8,037,517 B2 | 10/2011 | Fulp et al. |
| 8,042,167 B2 | 10/2011 | Fulp et al. |
| 8,117,655 B2 | 2/2012 | Spielman |
| 8,156,206 B2 | 4/2012 | Kiley et al. |
| 8,176,561 B1 | 5/2012 | Hurst et al. |
| 8,219,675 B2 | 7/2012 | Ivershen |
| 8,271,645 B2 | 9/2012 | Rajan et al. |
| 8,306,994 B2 | 11/2012 | Kenworthy |
| 8,307,029 B2 | 11/2012 | Davis et al. |
| 8,331,234 B1 | 12/2012 | Newton et al. |
| 8,422,391 B2 | 4/2013 | Zhu |
| 8,495,725 B2 | 7/2013 | Ahn |
| 8,510,821 B1 | 8/2013 | Brandwine et al. |
| 8,726,379 B1 | 5/2014 | Stiansen et al. |
| 8,789,135 B1 | 7/2014 | Pani |
| 8,806,638 B1 | 8/2014 | Mani |
| 8,832,832 B1 | 9/2014 | Visbal |
| 8,856,926 B2 | 10/2014 | Narayanaswamy et al. |
| 8,935,785 B2* | 1/2015 | Pandrangi ........... H04L 63/1416 709/224 |
| 9,094,445 B2 | 7/2015 | Moore et al. |
| 9,124,552 B2 | 9/2015 | Moore |
| 9,137,205 B2 | 9/2015 | Rogers et al. |
| 9,154,446 B2 | 10/2015 | Gemelli et al. |
| 9,160,713 B2 | 10/2015 | Moore |
| 9,172,627 B2 | 10/2015 | Kjendal et al. |
| 9,419,942 B1 | 8/2016 | Buruganahalli et al. |
| 9,531,672 B1 | 12/2016 | Li et al. |
| 9,634,911 B2 | 4/2017 | Meloche |
| 9,686,193 B2 | 6/2017 | Moore |
| 2001/0039579 A1 | 11/2001 | Trcka et al. |
| 2001/0039624 A1 | 11/2001 | Kellum |
| 2002/0016858 A1 | 2/2002 | Sawada et al. |
| 2002/0038339 A1 | 3/2002 | Xu |
| 2002/0049899 A1 | 4/2002 | Kenworthy |
| 2002/0083345 A1 | 6/2002 | Halliday et al. |
| 2002/0112188 A1 | 8/2002 | Syvanne |
| 2002/0152209 A1 | 10/2002 | Merugu et al. |
| 2002/0164962 A1 | 11/2002 | Mankins et al. |
| 2002/0165949 A1 | 11/2002 | Na et al. |
| 2002/0186683 A1 | 12/2002 | Buck et al. |
| 2002/0198981 A1 | 12/2002 | Corl et al. |
| 2003/0005122 A1 | 1/2003 | Freimuth et al. |
| 2003/0014665 A1 | 1/2003 | Anderson et al. |
| 2003/0018591 A1 | 1/2003 | Komisky |
| 2003/0035370 A1 | 2/2003 | Brustoloni |
| 2003/0051026 A1 | 3/2003 | Carter et al. |
| 2003/0088787 A1 | 5/2003 | Egevang |
| 2003/0097590 A1 | 5/2003 | Syvanne |
| 2003/0105976 A1 | 6/2003 | Copeland |
| 2003/0120622 A1 | 6/2003 | Nurmela et al. |
| 2003/0123456 A1 | 7/2003 | Denz et al. |
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0154399 A1 | 8/2003 | Zuk et al. |
| 2003/0188192 A1 | 10/2003 | Tang et al. |
| 2003/0212900 A1 | 11/2003 | Liu et al. |
| 2003/0220940 A1 | 11/2003 | Futoransky et al. |
| 2004/0010712 A1 | 1/2004 | Hui et al. |
| 2004/0015719 A1 | 1/2004 | Lee et al. |
| 2004/0073655 A1 | 4/2004 | Kan et al. |
| 2004/0088542 A1 | 5/2004 | Daude et al. |
| 2004/0093513 A1 | 5/2004 | Cantrell et al. |
| 2004/0098511 A1 | 5/2004 | Lin et al. |
| 2004/0114518 A1 | 6/2004 | MacFaden et al. |
| 2004/0123220 A1 | 6/2004 | Johnson et al. |
| 2004/0131056 A1 | 7/2004 | Dark |
| 2004/0148520 A1 | 7/2004 | Talpade et al. |
| 2004/0151155 A1 | 8/2004 | Jouppi |
| 2004/0172529 A1 | 9/2004 | Culbert |
| 2004/0172557 A1 | 9/2004 | Nakae et al. |
| 2004/0177139 A1 | 9/2004 | Schuba et al. |
| 2004/0181690 A1 | 9/2004 | Rothermel et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0250124 A1 | 12/2004 | Chesla et al. |
| 2005/0010765 A1 | 1/2005 | Swander et al. |
| 2005/0024189 A1 | 2/2005 | Weber |
| 2005/0071650 A1 | 3/2005 | Jo et al. |
| 2005/0076227 A1 | 4/2005 | Kang et al. |
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0229246 A1 | 10/2005 | Rajagopal et al. |

(56) References Cited

U.S. PATENT DOCUMENTS

| | | |
|---|---|---|
| 2005/0249214 A1 | 11/2005 | Peng |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1* | 3/2006 | Roese .............. H04L 63/1416 717/176 |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |
| 2007/0147380 A1 | 6/2007 | Ormazabal et al. |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1* | 8/2010 | Raleigh .............. H04W 12/088 709/224 |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1* | 6/2011 | Jayawardena ...... H04L 63/1416 370/237 |
| 2011/0154470 A1 | 6/2011 | Grimes et al. |
| 2011/0185055 A1 | 7/2011 | Nappier et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0084866 A1 | 4/2012 | Stolfo |
| 2012/0106354 A1 | 5/2012 | Pleshek et al. |
| 2012/0110656 A1 | 5/2012 | Santos et al. |
| 2012/0113987 A1 | 5/2012 | Riddoch et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0047020 A1 | 2/2013 | Hershko et al. |
| 2013/0055374 A1* | 2/2013 | Kustarz ................ G06F 21/55 726/13 |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0254766 A1 | 9/2013 | Zuo et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245423 A1 | 8/2014 | Lee |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0317737 A1 | 10/2014 | Shin et al. |
| 2014/0337613 A1 | 11/2014 | Martini |
| 2014/0365372 A1 | 12/2014 | Ross et al. |
| 2014/0366132 A1 | 12/2014 | Stiansen et al. |
| 2015/0033336 A1 | 1/2015 | Wang et al. |
| 2015/0052601 A1 | 2/2015 | White et al. |
| 2015/0106930 A1 | 4/2015 | Honda et al. |
| 2015/0128274 A1 | 5/2015 | Giokas |
| 2015/0135325 A1 | 5/2015 | Stevens et al. |
| 2015/0207809 A1 | 7/2015 | Macaulay |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0347246 A1 | 12/2015 | Matsui et al. |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Cruz Mota et al. |
| 2016/0065611 A1 | 3/2016 | Fakeri-Tabrizi et al. |
| 2016/0112443 A1 | 4/2016 | Grossman et al. |
| 2016/0119365 A1 | 4/2016 | Barel |
| 2016/0127417 A1 | 5/2016 | Janssen |
| 2016/0191558 A1 | 6/2016 | Davison |
| 2016/0205069 A1 | 7/2016 | Blocher et al. |
| 2016/0219065 A1 | 7/2016 | Dasgupta et al. |
| 2016/0285706 A1 | 9/2016 | Rao |
| 2016/0294870 A1 | 10/2016 | Banerjee et al. |
| 2016/0366099 A1 | 12/2016 | Jordan |

(56) References Cited

U.S. PATENT DOCUMENTS

| | | | |
|---|---|---|---|
| 2017/0223046 A1 | 8/2017 | Singh | |
| 2017/0272469 A1 | 9/2017 | Kraemer et al. | |

FOREIGN PATENT DOCUMENTS

| | | | |
|---|---|---|---|
| CA | 2600236 | A1 | 10/2006 |
| EP | 1006701 | A2 | 6/2000 |
| EP | 1313290 | A1 | 5/2003 |
| EP | 1484884 | A2 | 12/2004 |
| EP | 1677484 | A2 | 7/2006 |
| EP | 2385676 | A1 | 11/2011 |
| EP | 2498442 | A1 | 9/2012 |
| EP | 1864226 | B1 | 5/2013 |
| KR | 20010079361 | A | 8/2001 |
| WO | 2005046145 | A1 | 5/2005 |
| WO | 2006093557 | A2 | 9/2006 |
| WO | 2006105093 | A2 | 10/2006 |
| WO | 2007109541 | A2 | 9/2007 |
| WO | 2011038420 | A2 | 3/2011 |
| WO | 2012146265 | A1 | 11/2012 |

OTHER PUBLICATIONS

Reumann, J. et al, "Adaptive Packet Filters", 2001, IEEE (Year: 2001).*
May 6, 2016—(US) Office Action—U.S. Appl. No. 14/714,207.
May 13, 2016—(US) Office Action—U.S. Appl. No. 13/940,240.
Jun. 14, 2016—(US) Office Action—U.S. Appl. No. 14/625,486.
Feb. 25, 2016—(AU) Office Action—App 2014249055.
Feb. 24, 2016—(AU) Office Action—App 2014228257.
Jun. 9, 2016—(WO) International Search Report—PCT/US2016/026339.
Jun. 16, 2016—(CA) Office Action—App 2,888,935.
Jul. 11, 2016—(EP) Office Action—App 14720824.3.
Jul. 22, 2016—(US) Office Action—U.S. Appl. No. 14/921,718.
Jul. 20, 2016—(AU) Office Action—App 2013335255.
Oct. 5, 2016—(US) Notice of Allowance—U.S. Appl. No. 14/698,560.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Oct. 26, 2016—(US) Office Action—U.S. Appl. No. 13/940,240.
Nov. 21, 2016—(US) Office Action—U.S. Appl. No. 14/745,207.
Dec. 5, 2016—(US) Notice of Allowance—U.S. Appl. No. 14/714,207.
Singh, Rajeev et al. "Detecting and Reducing the Denial of Service attacks in WLANs", Dec. 2011, World Congress on Information and Communication TEchnologies, pp. 968-973.
Feb. 10, 2017—(US) Notice of Allowance—U.S. Appl. No. 14/625,486.
Feb. 15, 2017—(US) Notice of Allowance—U.S. Appl. No. 14/921,718.
Apr. 12, 2017—(US) Office Action—U.S. Appl. No. 14/757,638.
Mar. 6, 2017—(WO) International Search Report and Written Opinion—App PCT/US2016/068008.
Jun. 7, 2017—(US) Office Action—U.S. Appl. No. 14/745,207.
Sep. 4, 2015 (US) Notice of Allowance—U.S. Appl. No. 14/702,755.
Jun. 7, 2017—(WO) International Search Report and Written Opinion—App PCT/US2016/067111.
Aug. 15, 2017 (WO) International Preliminary Report on Patentability—App. PCT/US2015/062691.
Aug. 21, 2017 (AU) First Examination Report—App. 2015248067.
Sep. 29, 2017 (CA) Examination Report—App. 2,772,630.
Oct. 17, 2017 (WO) International Preliminary Report on Patentability—App. PCT/US2016/026339.
Nov. 3, 2017 (US) Non-Final Office Action—U.S. Appl. No. 15/413,834.
Nov. 21, 2017 (US) Notice of Allowance—U.S. Appl. No. 14/690,302.
Sep. 5, 2017 (US) Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.
Sep. 5, 2017 (US) Request for Judicial Notice in Support of Defendants Ixia and Keysight Technologies, Inc's Motion to Dismiss for Unpatentability under 35 U.S.C § 101—Case No. 2:17-cv-00383-HCN-LRL, Document 22, 3 pages.
Jul. 20, 2017 (US) Complaint for Patent Infringement—Case No. 2:17-cv-00383-HCN-LRL, Document 1, 38 pages.
Sep. 5, 2017 (US) Defendant Ixia's Partial Answer to Complaint for Patent Infringement—Case No. 2:17-cv-00383-HCN-LRL, Document 29, 14 pages.
Mar. 8, 2018 (US) Non-Final Office Action—U.S. Appl. No. 14/745,207.
Mar. 16, 2018 (EP) Communication Pursuant to Rule 164(2)(b) and Article 94(3) EPC—App. 15722292.8.
Mar. 15, 2018 (EP) Second Communication pursuant to Article 94(3) EPC—App. 13765547.8.
Mar. 21, 2018 (AU) First Examination Report—App. 2015382393.
Apr. 17, 2018 (US) Non-Final Office Action—U.S. Appl. No. 15/610,995.
May 25, 2018 (US) Notice of Allowance—U.S. Appl. No. 15/413,834.
Chen, et al, "Research on the Anomaly Discovering Algorithm of the Packet Filtering Rule Sets," Sep. 2010, First International Confererence on Pervasive Computing, Signal Processing and Applications, pp. 362-366.
Jul. 5, 2018 (US) Non-Final Office Action—U.S. Appl. No. 15/413,750.
Jul. 13, 2018 (US) Notice of Allowance—U.S. Appl. No. 15/414,117.
Jul. 27, 2018 (US) Non-Final Office Action—U.S. Appl. No. 15/382,806.
Sourcefire 3D System User Guide, Version 4.10, Mar. 16, 2011, 2123 pages.
Jul. 11, 2018 (US) Declaration of Kevin Jeffay, PhD in Support of Petition for Inter Partes Review of U.S. Pat. No. 9,565,213—IPR2018-01386.
Ylonen, et al., "The Secure Shell (SSH) Transport Layer Protocol," SSH Communication Security Corp, Newtork Working Group RFC 4253, Jan. 2006, 32 pages.
Jul. 20, 2018 (US) Declaration of Dr. Stuart Staniford in Support of Petition for Inter Partes Review of U.S. Pat. No. 9,160,713—IPR2018-01437.
Jul. 20, 2018 (US) Declaration of Dr. Stuart Staniford in Support of Petition for Inter Partes Review of U.S. Pat. No. 9,124,552—IPR2018-01436.
Jun. 24, 2014 (WO) International Search Report—App. PCT/US2014/023286.
Mar. 24, 2014 (WO) International Search Report—App. PCT/US2013/072566.
Jun. 26, 2014 (WO) International Search Report—App. PCT/US2014/027723.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
Nov. 7, 2013 (WO) International Search Report—App. PCT/US2013/057502.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Reumann, John; "Adaptive Packet Filters"; IEEE, 2001, Department of Electrical Engineering and Computer Science, The University of Michigan, Ann Arbor, MI.
Greenwald, Michael; "Designing an Academic Firewall: Policy, Practice, and Experience with Surf"; IEEE, Proceedings of SNDSS, 1996.
Mizuno et al., A New Remote Configurable Firewall System for Home-use Gateways, Jan. 2005. Second IEEE Consumer Communications and Networking Conference, pp. 599-601.
Kindervag, et al. "Build Security Into Your Network's DNA: The Zero Trust Network Architecture," Forrester Research Inc.; Noverrmber 5, 2010, pp. 1-26.
Palo Alto Networks; "Designing A Zero Trust Network With Next-Generation Firewalls"; pp. 1-10; last viewed on Oct. 21, 2012.
Jan. 11, 2016—(US) Non Final Rejection—U.S. Appl. No. 14/698,560.
Apr. 27, 2011—(WO) International Search Report and Written Opinion—App PCT/US2010/054520.

(56) References Cited

OTHER PUBLICATIONS

Mar. 4, 2011—(US) Notice of Allowance—U.S. Appl. No. 11/316,331.
Mar. 3, 2011—(EP) Communication Pursuant to Rules 70(2) and 70a(2)—App 06758213.0.
Feb. 14, 2011—(EP) Search Report—App 06758213.0.
Fulp, Errin: "CV: Errin Fulp," XP002618346, www.cs.wfu.edu/fulp/ewfPub.html, pp. 1-5 (Copyright 2010).
Sep. 30, 2010—(US) Office Action—U.S. Appl. No. 11/390,976.
Sep. 10, 2010—(AU) Office Action—App 2006230171.
Aug. 20, 2010—(AU) Office Action—App 2005328336.
Jun. 23, 2010—(US) Final Rejection—U.S. Appl. No. 11/316,331.
Apr. 29, 2010—(US) Interview Summary—U.S. Appl. No. 11/390,976.
Mar. 26, 2010—(US) Final Rejection—U.S. Appl. No. 11/390,976.
Sep. 14, 2009 (US) Office Action—U.S. Appl. No. 11/316,331.
Jun. 24, 2009—(US) Office Action—U.S. Appl. No. 11/390,976.
Jul. 3, 2008—(WO) Written Opinion of the International Searching Authority—App PCT/US06/11291.
Aug. 31, 2007—(EP) Communication Pursuant to Rules 109 and 110—App 05857614.1.
Acharya et al., "OPTWALL: A Hierarchical Traffic-Aware Firewall," Department of Computer Science, Telecommunications Program, University of Pittsburgh, pp. 1-11 (2007).
Sep. 11, 2006—(WO) Written Opinion of the International Searching Authority—App PCT/US05/47008.
Tarsa et al., "Balancing Trie-Based Policy representations for Network Firewalls," Department of Computer Science, Make Forest University, pp. 1-6 (2006).
Fulp, "Trie-Based Policy Representations for Network Firewalls," Proceedings of the IEEE International Symposium on Computer Communications (2005).
E. Fulp, "Optimization of Network Firewall Policies Using Ordered Sets and Directed Acyclical Graphs", Technical Report, Computer Scient Department, Wake Forest University, Jan. 2004.
E. Fulp et al., "Network Firewall Policy Tries", Technical Report, Computer Science Depailment, Wake Forest University, 2004.
E. Al-Shaer et al., "Modeling and Management of Firewall Policies", IEEE Transactions on Network and Service Management, 1(1): 2004.
E.W. Fulp, "Firewall Architectures for High Speed Networks", U.S. Department of Energy Grant Application, Funded Sep. 2003.
E. Al-Shaer et al., "Firewall Policy Advisor for Anomaly Discovery and Rule Editing", Proceedings of the IFIP/IEEE International Symposium on Integrated Network Management, 2003.
V.P. Ranganath, "A Set-Based Approach to Packet Classification", Proceedings of the IASTED International Conference on Parallel and Distributed Computing and Systems, 889-894, 2003.
M. Christiansen et al., "Using IDDs for Packet Filtering," Technical Report, BRICS, Oct. 2002.
Lee et al., "Development Framework for Firewall Processors," IEEE, pp. 352-355 (2002).
L. Qui et al., "Fast Firewall Implementations for Software and Hardware-Based Routers", Proceedings of ACM Sigmetrics, Jun. 2001.
D. Eppstein et al., "Internet Packet Filter Management and Rectangle Geometry", Proceedings of the Symposium on Discrete Algorithms, 827-835, 2001.
E. Fulp, "Preventing Denial of Service Attacks on Quality of Service", Proceedings of the 2001 DARPA Information Survivability Conference and Exposition II, 2001.
S. Goddard et al., "An Unavailability Analysis of Firewall Sandwich Configurations", Proceedings of the 6th IEEE Symposium on High Assurance Systems Engineering, 2001.
G.V. Rooij, "Real Stateful TCP Packet Filtering in IP Filter", Proceedings of the 10th USENIX Security Symposium, 2001.
P. Warkhede et al., "Fast Packet Classification for Two-Dimensional Conflict-Free Filters", Proceedings of IEEE INFOCOM, 1434-1443, 2001.
D. Decasper et al., "Router Plugins: A Software Architecture for Next-Generation Routers", IEEE/ACM Transactions on Networking, 8(1): Feb. 2000.
A. Feldmann et al., "Tradeoffs for Packet Classification", Proceedings of the IEEE INFOCOM, 397-413, 2000.
X. Gan et al., "LSMAC vs. LSNAT: Scalable Cluster-based Web servers", Journal of Networks, Software Tools, and Applications, 3(3): 175-185, 2000.
A. Hari et al., "Detecting and Resolving Packet Filter Conflicts", Proceedings of IEEE INFOCOM, 1203-1212, 2000.
O. Paul et al., "A full Bandwidth ATM Firewall", Proceedings of the 6th European Symposium on Research in Computer Security ESORICS'2000, 2000.
J. Xu et al., "Design and Evaluation of a High-Performance ATM Firewall Switch and Its Applications", IEEE Journal on Selected Areas in Communications, 17(6): 1190-1200, Jun. 1999.
C. Benecke, "A Parallel Packet Screen for High Speed Networks", Proceedings of the 15th Annual Computer Security Applications Conference, 1999.
R. Funke et al., "Performance Evaluation of Firewalls in Gigabit-Networks", Proceedings of the Symposium on Performance Evaluation of Computer and Telecommunication Systems, 1999.
S. Suri et al., "Packet Filtering in High Speed Networks", Proceedings of the Symposium on Discrete Algorithms, 969-970, 1999.
J. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
M. Degermark et al., "Small Forwarding Tables for Fast Routing Lookups", Proceedings of ACM SIGCOMM, 4-13, 1997.
S,M. Bellovin et al., "Network Firewalls", IEEE Communications Magazine, 50-57, 1994.
W.E. Leland et al., "On the Self-Similar Nature of Ethernet Traffic", IEEE Transactions on Networking, 2(1); 15, 1994.
G. Brightwell et al., "Counting Linear Extensions is #P-Complete", Proceedings of the Twenty-Third Annual ACM Symposium on Theory of Computing, 1991.
M. Al-Suwaiyel et al., "Algorithms for Trie Compaction", ACM Transactions on Database Systems, 9(2): 243-263, Jun. 1984.
D. Corner, "Analysis of a Heuristic for Full Trie Minimization", ACM Transactions on Database Systems, 6(3): 513-537, Sep. 1981.
R.L. Graham et al., "Optimization and Approximation in Deterministic Sequencing and Scheduling: A Survey", Annals of Discrete Mathematics, 5:287-326, 1979.
E.L. Lawler, "Sequencing Jobs to Minimize Total Weighted Completion Time Subject to Precedence Constraints", Annals of Discrete Mathematics, 2: 75-90, 1978.
J.K. Lenstra et al., "Complexity of Scheduling Under Precedence Constraints", Operations Research, 26(1): 22-35, 1978.
R. Rivest, "On Self-Organizing Sequential Search Heuristics", Communications of the ACM, 19(2): 1976.
W.E. Smith, "Various Optimizers for Single-Stage Productions", Naval Research Logistics Quarterly, 3: 59-66, 1956.
Bellion, "High Performance Packet Classification", http://www.hipac.org (Publication Date Unknown).
Oct. 18, 2011—(EP) Communication Pursuant to Article 94(3)—App 06 758 213.0.
Jun. 9, 2011—(US) Notice of Allowance—U.S. Appl. No. 11/390,976.
Jun. 26, 2012—(EP) Extended Search Report—App 05857614.1.
Jun. 9, 2012—(AU) Notice of Acceptance—App 2006230171.
Nov. 11, 2011—(AU) Second Office Action—App 2006230171.
Jan. 17, 2013—(CA) Office Action—App 2,600,236.
Jan. 16, 2013—(CA) Office Action—App 2,594,020.
Nov. 20, 2012—(EP) Communication under rule 71(3)—App 06 758 213.0.
Apr. 18, 2013—(EP) Decision to Grant a European Patent—App 06758212.0.
Aug. 25, 2011—(US) Non Final Rejection—U.S. Appl. No. 12/871,806.
Feb. 6, 2012—(US) Final Rejection—U.S. Appl. No. 12/871,806.
Aug. 7, 2012—(US) Non Final Rejection—U.S. Appl. No. 12/871,806.
Nov. 26, 2012—(US) Final Rejection—U.S. Appl. No. 12/871,806.
Apr. 4, 2013—(US) Notice of Allowance—U.S. Appl. No. 12/871,806.
Jan. 14, 2015—(EP) Extended Search Report—App 10819667.6.
May 26, 2014—(CA) Office Action—App 2010297968.
May 25, 2015—(AU) Notice of Acceptance—App 2010297968.
May 14, 2015—(US) Non Final Rejection—U.S. Appl. No. 13/940,240.

(56) References Cited

OTHER PUBLICATIONS

Nov. 27, 2015—(US) Final Rejection—U.S. Appl. No. 13/940,240.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
Jan. 28, 2016—(WO) International Search Report and Written Opinion—App PCT/US2015/062691.
Sep. 16, 2015 (WO) International Search Report and Written Opinion—App. No. PCT/US2015/024691.
Apr. 28, 2015 (WO) International Preliminary Report on Patentability—App. PCT/US2013/057502, dated Apr. 28, 2015.
Sep. 15, 2015 (WO) International Preliminary Report on Patentability—App. PCT/US2014/023286.
Sep. 15, 2015 (WO) International Preliminary Report on Patentability—App.—PCT/US2014/027723.
Statement RE: Related Application, dated Jul. 24, 2015.
Dec. 22, 2015—(US) Final Office Action—U.S. Appl. No. 14/714,207.
Feb. 26, 2016—(US) Non Final Office Action—U.S. Appl. No. 14/253,992.
Apr. 15, 2016—(US) Notice of Allowance—U.S. Appl. No. 14/855,374.
Nov. 2, 2015—(AU) Office Action—App 2013372879.
Apr. 26, 2016—(US) Office Action—U.S. Appl. No. 14/745,207.
Jul. 26, 2018 (US) Declaration of Kevin Jeffay, PhD in Support of Second Petition for Inter Partes Review of U.S. Pat. No. 9,137,205—IPR2018-01444.
Nichols, et al, "Definition of the Differentiated Services Field (DS Field) in the IPv4 and IPv6 Headers," Network Working Group RFC 2474, Dec. 1998, 20 pages.
Jul. 26, 2018 (US) Declaration of Kevin Jeffay, PhD in Support of First Petition for Inter Partes Review of U.S. Pat. No. 9,137,205—IPR2018-01443.
Perkins, "IP Encapsulation with IP," Network Working Group RFC 2003, Oct. 1996, 14 pages.
Jul. 12, 2018 (US) Petition for Inter Partes Review of U.S. Pat. No. 9,565,213—IPR2018-01386.
Jul. 20, 2018 (US) Petition for Inter Partes Review of U.S. Pat. No. 9,160,713—IPR2018-01437.
Jul. 20, 2018 (US) Petition for Inter Partes Review of U.S. Pat. No. 9,124,552—IPR2018-01436.
Blake, et al, "An Architecture for Differentiated Services," Network Working Group RFC 2475, Dec. 1998, 36 pages.
Jul. 27, 2018 (US) Second Petition for Inter Partes Review of U.S. Pat. No. 9,137,205—IPR2018-01444.
Jul. 27, 2018 (US) First Petition for Inter Partes Review of U.S. Pat. No. 9,137,205—IPR2018-01443.
Aug. 9, 2018 (US) Non-Final Office Action—U.S. Appl. No. 15/413,947.
Sep. 4, 2018 (WO) International Search Report and Written Opinion—App. PCT/US2018/041355.
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Sep. 27, 2018 (US) Non-Final Office Action—U.S. Appl. No. 15/614,956.
Oct. 4, 2018 (US) Non-Final Office Action—U.S. Appl. No. 16/030,374.
Oct. 4, 2018 (US) Notice of Allowance—U.S. Appl. No. 15/827,477.
Aug. 20, 2018 (US) Petition for Inter Partes Review of U.S. Pat. No. 9,565,213—IPR2018-01512.
Aug. 15, 2018 (US) Declaration of Kevin Jeffay, PhD in Support of Petition for Inter Partes Review of U.S. Pat. No. 9,565,213—IPR2018-01512.
"Cisco ACNS Softwrd Configuration Guide for Centrally Managed Deployments," Release 5.5. Text Part No. OL-9136-01, Cisco Systems, Inc., 2006, 944 pages.
Blake, et al., "An Architecture for Differentiated Services," also known as the Diffserv architecture, as defined in RFC 2475, Network Working Group, Decemer 1998, 36 pages.
Sep. 27, 2018 (WO) International Search Report and Written Opinion—App. PCT/US2018/043367.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Oct. 12, 2018 (US) Non-Final Office Action—U.S. Appl. No. 16/039,896.
Aug. 29, 2018 (CA) Office Action—App. 2,888,935.
Nov. 14, 2018 (US) Final Office Action—U.S. Appl. No. 14/745,207.
Dec. 18, 2018 (US) Final Office Action—U.S. Appl. No. 15/610,995.
Jan. 24, 2019 (US) Notice of Allowance—U.S. Appl. No. 15/610,995.
Feb. 6, 2019 (US) Final Office Action—U.S. Appl. No. 15/413,750.
Feb. 6, 2019 (US) Notice of Allowance and Fees Due—U.S. Appl. No. 16/039,896.
Sep. 17, 2018 (US) Petition for Inter Partes Review of U.S. Pat. No. 9,560,176 (First)—IPR 2018-01654.
Sep. 17, 2018 (US) Declaration of Narasimha Reddy Ph D., in Support Of Petition for Inter Partes Review of U.S. Pat. No. 9,560,176 (First)—IRP2018-01654.
Sep. 17, 2018 (US) Petition for Inter Partes review of U.S. Pat. No. 9,560,176 (Second)—IPR2018-01655.
Sep. 17, 2018 (US) Declaration of Narasimha Reddy Ph D., in Support Of Petition for Inter Partes Review of U.S. Pat. No. 9,560,176 (Second)—IRP2018-01655.
Reddy, A.L.(2012) A.L. Narasimha Reddy Curriculum Vitae. Retrieved from https://cesg.tamu.edu/wp-content/uploads/2012/02/res_ext032.pdf, 16 pages.
Frahim, et al., "Cisco ASA: All-in-One Firewall, IPS, and VPN Adaptive Security Appliance," Indiana: Cisco Press: 2006, 54 pages.
Mar. 8, 2019 (US) Notice of Allowance and Fees Due—U.S. Appl. No. 16/060,374.
Mar. 11, 2019 (US) Final Office Action—U.S. Appl. No. 16/030,354.
Feb. 21, 2019 (US) Final Office Action—U.S. Appl. No. 15/382,806.
Jan. 24, 2019 (US) Decision—Institution of Inter Partes Review of U.S. Pat. No. 9,160,713 B2—IPR 2018-01437.
Mar. 8, 2019 (US) Notice of Allowance and Fees Due—U.S. Appl. No. 16/030,374.
Aug. 21, 2018 (US) Petition for Inter Partes Review of U.S. Pat. No. 9,686,193—IPR2018-01559.
Aug. 15, 2018 (US) Declaration of Staurt Staniford, PhD in Support of Petition for Inter Partes Review of U.S. Pat. No. 9,686,193—IPR2018-01556.
Jan. 24, 2019 (US) Decision—Institution of Inter Partes Review of U.S. Pat. No. 9,124,552 B2—IPR 2018-01436.
Mar. 18, 2019 (AU) First Examination Report—App. 2016379156.
Apr. 8, 2019 (US) Final Office Action—U.S. Appl. No. 15/413,947.
Aug. 10, 2018 (US) Declaration of Kevin Jeffay, PhD in Support of Fourth Petition for Inter Partes Review of U.S. Pat. No. 9,137,205—IPR2018-01506.
Aug. 10, 2018 (US) Fourth Petition for Inter Partes Review of U.S. Pat. No. 9,137,205—IPR2018-01506.
Aug. 3, 2018 (US) Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,560,077—IPR2018-01513.
Apr. 2, 2019 (US) Decision—Institution of Inter Partes Review of U.S. Pat. No. 9,560,077—IPR 2018-01513.
Aug. 10, 2018 (US) Petition for Inter Partes Review of Claims 1-20 of U.S. Pat. No. 9,560,077—IPR2018-01513.
Jun. 3, 2019 (US) Final Office Action—U.S. Appl. No. 15/614,956.
May 23, 2019 (US) Non-Final Office Action—U.S. Appl. No. 14/745,207.

(56) References Cited

OTHER PUBLICATIONS

May 24, 2019 (US) Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 (US) Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 (US) Non-Final Office Action—U.S. Appl. No. 16/448,969.
Aug. 16, 2019 (EP) Extended Search Report—App. 19170936.9.
Sep. 18, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.
Sep. 3, 2019 (US) Notice of Allowance and Fees Due—U.S. Appl. No. 16/518,190.
Aug. 1, 2019 (EP) Communication pursuant to Article 94(3) EPC—Examination Report—App. 14719415.3.
Oct. 11, 2019—(US) Non-Final Office Action—U.S. Appl. No. 16/554,293.
Oct. 10, 2019—(US) Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.
Exhibit 1024—"File Transfer Protocol," IETF RFC 765, J. Postel, ed., Jun. 1980.
May 20, 2019 (US) Decision—Institution of Inter Partes Review of U.S. Pat. No. 9,413,722 B1—IPR 2018-01760.
Aug. 20, 2019 (US) Declaration of Dr. Alessandro Orso in Support of Patent Owner's Response of U.S. Pat. No. 9,413,722—IPR 2018-01760.
Feb. 21, 2019 (US) Patent Owner's Preliminary Response of U.S. Pat. No. 9,413,722—IPR 2018-01760.
Aug. 20, 2019 (US) Patent Owner's Response of U.S. Pat. No. 9,413,722—IPR 2018-01760.
Jan. 15, 2020 (US) Patent Owner's Sur-Reply to Petitioner's Reply—IPR 2018-01760.
Jan. 8, 2020 (US) Deposition of Jacob H. Baugher, III—IPR 2018-01760.
U.S. Appl. No. 14/745,207, filed Jun. 19, 2015.
U.S. Appl. No. 13/838,471, filed Mar. 15, 2013.

* cited by examiner

| Rule # | Protocol | Source IP Address | Source Port | Destination IP Address | Destination Port | Action |
|---|---|---|---|---|---|---|
| 1 (301) | TCP | 123.56.89.0 | * | 87.65.21.0 | 179 | ALLOW |
| 2 (302) | TCP | 87.65.21.0 | * | 123.56.89.0 | 179 | ALLOW |
| 3 (303) | TCP | 123.56.89.0 | 179 | 87.65.21.0 | * | ALLOW |
| 4 (304) | TCP | 87.65.21.0 | 179 | 123.56.89.0 | * | ALLOW |
| 5 (305) | * | * | * | * | 53 | ALLOW |
| 6 (306) | * | * | 53 | * | * | ALLOW |
| 7 (307) | UDP | * | * | * | 123 | ALLOW |
| 8 (308) | UDP | * | 123 | * | * | ALLOW |
| 9 (309) | * | * | * | * | * | BLOCK |

Columns Protocol through Destination Port are bracketed as "Five-tuple".

FIG. 3

| Rule # | Protocol | Source IP Address | Source Port | Destination IP Address | Destination Port | Action |
|---|---|---|---|---|---|---|
| ... | ... | ... | ... | ... | ... | ... |
| 10 (401) | * | 32.10.87.* | * | 13.57.92.46 | 53 | ALLOW |
| 11 (402) | * | 13.57.92.46 | 53 | 32.10.87.* | * | ALLOW |
| 12 (403) | * | * | 53 | 32.10.87.* | * | BLOCK |
| ... | ... | ... | ... | ... | ... | ... |

Columns Protocol through Destination Port are the Five-tuple. Table 400.

FIG. 4

| Rule # | Protocol | Source IP Address | Source Port | Destination IP Address | Destination Port | Action |
|---|---|---|---|---|---|---|
| 13 (501) | TCP | 10.10.87.* | * | 13.13.87.* | 80 | ALLOW |
| 14 (502) | TCP | 13.13.87.* | 80 | 10.10.87.* | * | ALLOW |
| 15 (503) | TCP | 12.12.87.* | * | 13.13.87.* | 80 | ALLOW |
| 16 (504) | TCP | 13.13.87.* | 80 | 12.12.87.* | * | ALLOW |

Rules Contained in Policy 300 or Policy 400

FIG. 5

PROTECTING NETWORKS FROM CYBER ATTACKS AND OVERLOADING

CROSS-REFERENCE TO RELATED APPLICATION

This application is a continuation of and claims priority to U.S. patent application Ser. No. 14/745,207, filed Jun. 19, 2015, and entitled "PROTECTING NETWORKS FROM CYBER ATTACKS AND OVERLOADING," which is a continuation of U.S. patent application Ser. No. 13/838,471, filed Mar. 15, 2013 and entitled "PROTECTING NETWORKS FROM CYBER ATTACKS AND OVERLOADING," which issued as U.S. Pat. No. 9,094,445 on Jul. 28, 2015, the disclosures of which are incorporated by reference herein in their entireties and made part hereof.

BACKGROUND

The TCP/IP network protocols (e.g., the Transmission Control Protocol (TCP) and the Internet Protocol (IP)) were designed to build large, resilient, reliable, and robust networks. Such protocols, however, were not originally designed with security in mind. Subsequent developments have extended such protocols to provide for secure communication between peers (e.g., Internet Protocol Security (IPsec)), but the networks themselves remain vulnerable to attack (e.g., Distributed Denial of Service (DDoS) attacks).

The largest TCP/IP network, the Internet, has become critical communications infrastructure for many of the world's countries, such as the United States of America (US). The US government, US military, and critical US commercial interests (e.g., utilities, banks, etc.) have become operationally dependent on the Internet as the communications medium supporting distributed applications such as the telephone system, utilities grids, and e-commerce. For the US and many other countries, it is a matter of national security that the Internet, as well as some of the distributed applications that the Internet supports, hereafter called Internet applications, be available for use by certain organizations during episodes of extreme loading. Extreme loading, or overloading, of the Internet occurs when the volume of network traffic exceeds the effective transmission capacity of the network. Overloading of Internet applications occurs when application servers attached to the Internet (e.g., distributed application servers) cannot handle the volume of service requests that are delivered to the servers by the Internet. Either of these overload cases may occur during cyber attacks launched by malicious adversaries or during periods of heavy usage by legitimate users.

Often for reasons of national security, some organizations need to have the Internet and certain Internet applications available to them during overload events. This type of availability requirement has been imposed on pre-Internet telephony systems by some governments. For example, the US Government Emergency Telecommunications Service (GETS) ensures that certain organizations and personnel have emergency access and priority processing for telephone calls on the Public Switched Telephone Network (PSTN). Because of significant differences in protocols, architecture, organization, and operations between the PSTN and the Internet and Internet applications, the technologies, methods, and systems that support GETS cannot be readily ported to the Internet environment.

Accordingly, there is a critical need for technologies, methods, and systems that can meet availability requirements for the Internet and Internet applications during overload episodes.

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the detailed description below.

The core Internet is composed of many Autonomous System (AS) networks. An AS is defined in Internet Engineering Task Force (IETF) Request for Comments (RFC) 1930 as a connected group of one or more IP prefixes run by one or more network operators which has a single and clearly defined routing policy. An AS may be owned and operated by a commercial business (e.g., an Internet Service Provider (ISP)). An ISP may provide Internet connectivity to its subscribers, which are often enterprises that operate their own networks (e.g., private networks) to which associated endpoints (e.g., enterprise-affiliated desktop computers, servers, mobile devices, etc.) may be attached. These endpoints may host Internet application instances (e.g., web servers, web clients, voice telephony, instant messaging, social networking, etc.). These endpoints may be identified with Internet addresses that follow the Internet Protocol (IP), i.e., IP addresses. The application instances hosted by a given endpoint may be identified with ports associated with the given endpoint. For example, a web server instance may listen for requests sent to port 80 of the endpoint hosting the web server instance.

An ISP may need to provide its subscribers with connectivity or reachability to other endpoints that may not be attached to the ISP's subscribers' networks; instead, the other endpoints may be attached to networks of subscribers to different ISPs. To provide connectivity or reachability, an ISP may connect its AS networks to the AS networks of other ISPs. These points-of-connection are commonly called peering points, and ISPs that are directly connected to each other's AS networks are commonly called peers. The ISPs may be sufficiently interconnected via peering points such that the Internet allows any endpoint with an Internet IP address to send packets (e.g., via routing) to any other endpoint with an Internet IP address.

The Internet's open connectivity may be exploited by cyber adversaries to launch attacks (e.g., Denial-of-Service (DoS) attacks) against targets. In a DoS attack, network resources (e.g., routers, links, endpoints, servers, etc.) may be flooded with so many illegitimate service requests that legitimate requests are starved (e.g., the legitimate requests may be effectively denied service). A DoS attack may be carried out by a botnet, a large collection of compromised hosts which are controlled and directed by a central command and control agent to send packets to a target victim. One type of DoS attack, commonly called a "bandwidth" attack, may flood the network routers and links that are immediately upstream of the target with so much malicious traffic that the network cannot service (e.g., forward) many legitimate packets that are being routed to the target. Another type of DoS attack, commonly called an "application-level" DoS attack, may flood an application server (e.g., a web server) with so many illegitimate service requests (e.g., HTTP GET requests for web page downloads) that the application server is unable to service many legitimate requests, effectively denying service to legitimate users.

It is generally believed that a determined adversary, such as a government that is hostile to another country's government, could launch massive attacks (e.g., DoS attacks) against another country's Internet infrastructure that are sufficiently large and intense to effectively disable the target country's Internet and Internet applications. There is much empirical evidence to support this belief. Some of this evidence is gleaned from episodes of heavy usage by legitimate users, such as the Web flood by legitimate users that occurred immediately after the Sep. 11, 2001 terrorists attacks on the US. More evidence is gleaned from the attacks launched against US banks and financial institutions beginning in the Fall of 2012, and from attacks launched by the loosely associated hacktivist group known as "Anonymous." In both the malicious attack scenario and the legitimate flood scenario (and potentially other overload scenarios), for reasons of national security, the Internet and some Internet applications may need to be available to certain organizations and personnel.

Aspects of this disclosure may relate to ensuring availability of the Internet and some Internet applications to certain organizations and personnel, or users, when the Internet is experiencing overload conditions. Aspects of this disclosure may also relate to restoration of availability of the Internet and some Internet applications to progressively larger sets of users when the Internet is experiencing overload conditions. Said progression may terminate when normal availability is restored to all legitimate users.

In some embodiments, packet filtering devices may be located in the Internet at AS network boundary points, such as peering points and subscriber access points (e.g., Internet access points). The packet filtering devices may apply sets of filtering rules or policies, to packets traversing network links of the peering or subscriber points. If a packet matches a filter rule, the packet may be allowed to continue towards its destination or prevented or blocked from continuing towards its destination (e.g., the packet may be dropped), depending on the packet handling action specified by the matching rule. Some packet filtering devices may implement a packet handling action that rate-limits packets that match the associated rule (e.g., the action may both block and allow packets depending on whether or not a rate threshold has been exceeded).

Packet filtering devices may include network firewalls and router access control lists. A packet filtering device may be referred to herein as a Packet Security Gateway (PSG).

Packet security gateways may be associated with one or more policy management servers. Each packet security gateway may receive a policy from a policy management server. A policy management server may instruct the packet security gateway to enforce the policy (e.g., to apply rules specified in the policy to packet traffic passing through the packet security gateway). The packet security gateways may receive multiple policies from policy management servers. These policies may be stored locally by the packet security gateways and may not need to be transmitted from policy servers to packet security gateways (e.g., during overload conditions). Additionally or alternatively, the policy servers and packet security gateways may be interconnected by an "out-of-band" management network, which may be physically separate from the Internet infrastructure, and may thus be unaffected by Internet overload conditions.

When an overload condition is detected, some policy management servers may direct some packet security gateways to enforce a first set of policies. Policies in this first set may contain rules that block all packets except for packets associated with protocols and applications that are necessary for the Internet and critical Internet applications to operate. These protocols and applications may include, for example, Border Gateway Protocol (BGP), the Domain Name System (DNS), and the Network Time Protocol (NTP). When this first set of policies is being enforced, the packet traffic that caused the overload condition may be blocked from ingressing the Internet at Internet access points, or may be blocked at peering points. Additionally or alternatively, the packet traffic that caused the overload condition may be rate-limited when ingressing the Internet at Internet access points, or may be rate-limited at peering points. While this first set of policies is being enforced, ISPs and other network operators may take actions to eliminate or mitigate the sources of packet traffic that caused the overload condition.

In some embodiments, the policy management servers may direct the packet security gateways to enforce a second set of policies. Policies in this second set may contain rules from the first set of policies, and may also contain one or more additional rules which may allow packets between some Internet applications being used by some critical users or systems. For example, in a national emergency situation, first responders associated with local, state, and federal government organizations may be allowed to use the Internet for telephone calls, text messages, e-mail, web-based services, etc. While this second set of policies is being enforced, ISPs and other network operators may continue to take actions to eliminate or mitigate the sources of packet traffic that caused the overload condition.

In some embodiments, the policy management servers may direct the packet security gateways to enforce a third set of policies. Policies in this third set may contain rules from the first set of policies and rules from the second set of policies, and may also contain one or more additional rules which may allow packets between one or more additional critical organizations, personnel, and applications. While this third set of policies is being enforced, ISPs and other network operators may continue to take actions to eliminate or mitigate the sources of packet traffic that caused the overload condition.

In some embodiments, a cycle of enforcing sets of policies with progressively broader scopes of users and applications may be repeated until normal operation is restored (e.g., until legitimate users have the Internet and Internet applications available to them as they did before the overload conditions occurred).

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

FIG. 3 illustrates an exemplary packet filtering policy which may be enforced by a packet security gateway located at a peering point.

FIG. 4 illustrates an exemplary packet filtering policy which may be enforced by a packet security gateway located at an Internet access point.

FIG. 5 illustrates an exemplary packet filtering policy which may be enforced by a packet security gateway, and which may allow certain users or certain Internet applications to communicate.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless. In this respect, the specification is not intended to be limiting.

Figure 1:
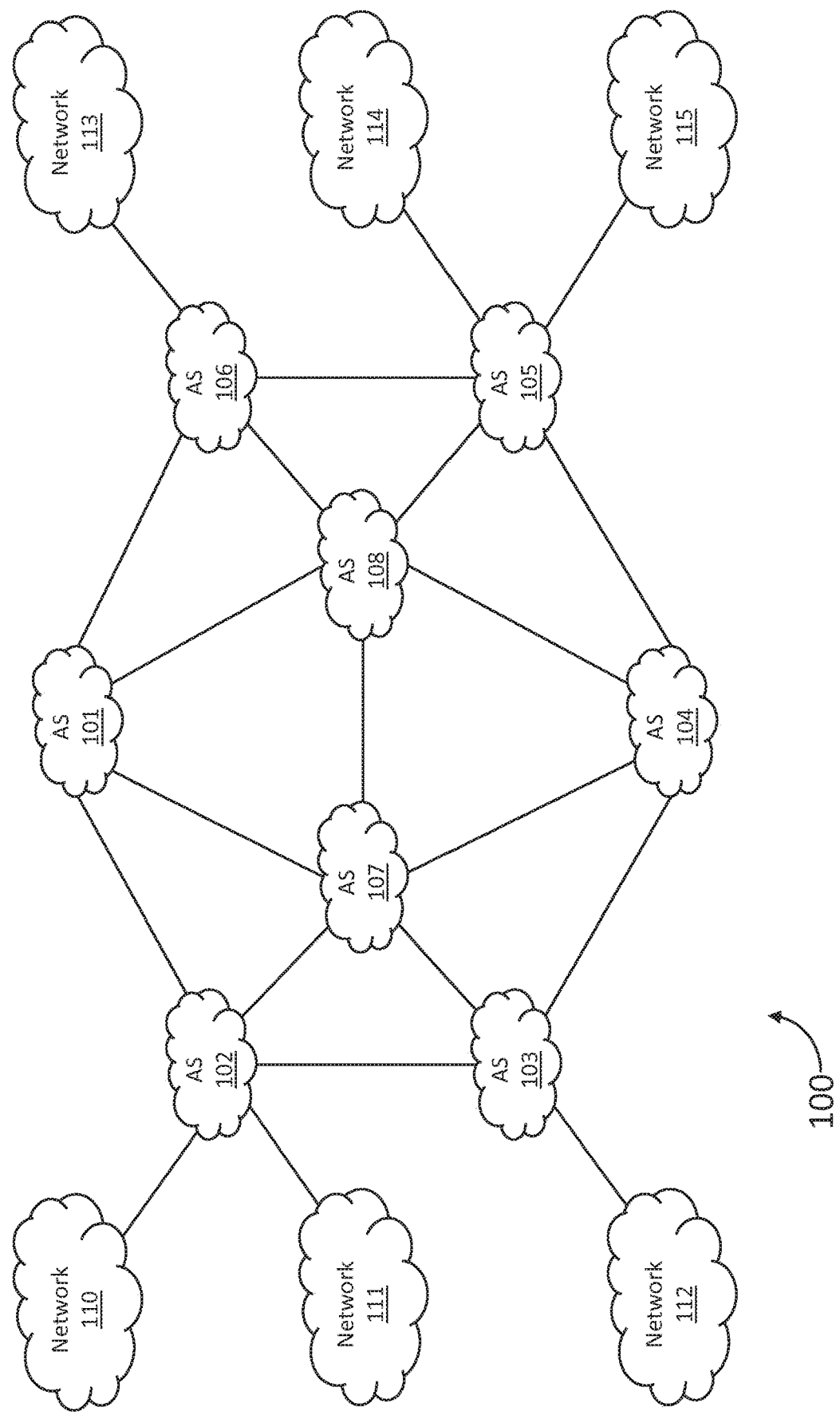
FIG. 1 illustrates an exemplary network environment in which one or more aspects of the disclosure may be implemented.

FIG. 1 illustrates an exemplary network environment in which one or more aspects of the disclosure may be implemented. Referring to FIG. 1, network environment 100 may be a TCP/IP network environment (e.g., the Internet).

Network environment 100 may include autonomous system (AS) networks 101, 102, 103, 104, 105, 106, 107, and 108. AS networks 101-108 may be owned or operated by various ISPs. AS networks 101-108 may function as transit networks (e.g., they may not have Internet-addressable endpoints attached to them and may therefore not terminate any packet microflows generated by Internet applications). For example, packets that ingresses one or more of AS networks 101-108 may also egresses the AS network. Interconnections between any two AS networks 101-108 may be peering points (e.g., a link between AS network 101 and AS network 107 may be a peering point).

Networks 110, 111, 112, 113, 114, and 115 may be owned or operated by various enterprises. One or more of networks 110-115 may or may not be an autonomous system network. One or more of networks 110-115 may not be a transit network and may be a private (non-public) network, and may therefore not be providing Internet service (e.g., an organization owning or operating one or more of networks 110-115 may not be an ISP). One or more endpoints (not shown in FIG. 1), such as desktop computers, servers, telephones, etc., may be affiliated with these enterprises and may be attached to one or more of networks 110-115. Such endpoints may host instances of various Internet applications, such as web servers and web clients (e.g., web browsers), text messaging servers and clients, IP telephony systems, etc. An owner or operator of one or more of networks 110-115 may want to allow endpoints attached to their network to be able to communicate with other endpoints attached to another of networks 110-115. For example, an owner or operator of network 110 may want to allow an endpoint attached to network 110 to communicate with an endpoint attached to network 115, which may be owned or operated by a different organization than the organization that owns or operates network 110. To achieve such inter-network communications between networks 110-115, the owners or operators of networks 110-115 may subscribe to one or more ISPs for Internet service. An ISP may connect one or more of its networks to a subscriber's network. For example, an ISP that owns or operates AS network 103 may connect network 103 with network 112, which may be owned or operated by an organization that has subscribed to the ISP. Connections between subscriber networks and ISP networks, such as the connection between network 112 and network 103, may be Internet access points.

ISPs may install routers that support the Border Gateway Control (BGP) protocol, called BGP routers, at the boundaries of their AS networks. A BGP router may know which IP addresses can be reached from its interfaces. Using the BGP protocol, a BGP router may advertise its reachability information to one or more BGP routers located at the border of different AS networks. For example, a BGP router may advertise to other BGP routers that are located at the boundaries of peer AS networks. A given BGP router may not communicate with every other BGP router in the Internet. A BGP router may utilize reachability information received from other BGP routers to compute a local routing table. A router's routing table may contain entries that associate an IP address with one of the router's network interfaces. When a router receives a packet, it may look up the packet's destination IP address in the routing table, and then forward the packet out the network interface specified in the routing table entry. The network interface may itself be connected to the network interface (e.g., an inbound network interface) of another router, which may repeat the lookup-and forward process. Eventually, the packet may reach its destination endpoint.

Utilization of the BGP protocol may be critical for enabling a network's packet routing service. In one or more implementations of a BGP router, the BGP protocol may also be used to determine if peer BGP routers are functioning, for example, via the use of KEEPALIVE messages. If a BGP router does not receive a KEEPALIVE response from a peer BGP router (e.g., after a configured timeout period), then the BGP router may determine that the peer BGP router is no longer functioning, and may stop forwarding packets to the peer BGP router. Accordingly, for a network such as the Internet to provide its packet routing service, BGP protocol communications between peer BGP routers may need to be maintained.

Internet applications may represent machine-readable IP addresses of endpoints (e.g., 173.194.75.103) using human-readable domain names (e.g., www.google.com). When an Internet application instance sends packets over the Internet to an endpoint, the packets may be required to contain the IP address of the endpoint in the destination IP address field of the packets' IP headers. An Internet application may know the domain name of a destination endpoint but may not know its IP address. An Internet application instance may issue a request to a Domain Name System (DNS) to resolve the domain name into an IP address, and the DNS may respond to the request with an IP address that corresponds to the domain name. The DNS may be a collection of servers distributed across the Internet that resolve domain names into IP addresses. The DNS and endpoints using the DNS may use the DNS protocol to inter-communicate. Although the Internet may not require the DNS to provide its packet routing service, and although in theory Internet applications may not need the DNS to intercommunicate, in practice the DNS may be critical to the function and operation of many Internet applications. Thus, for Internet applications to function, DNS protocol communications between the DNS and Internet applications may need to be maintained.

The Network Time Protocol (NTP) is a protocol for clock synchronization between computer systems attached to a TCP/IP network (e.g., the Internet). NTP may be architecturally similar to DNS in that there may be a hierarchical collection of clocks and associated time servers distributed across the Internet that computer systems may access. Internet applications may depend on synchronized time in order to function correctly; thus NTP protocol communications between time servers and Internet applications may need to be maintained.

There may be other systems and protocols associated with a network that may need to be functional or effectively communicating in order for the network or one or more critical network applications to function correctly.

Overload conditions may occur in a network (e.g., the Internet) when any of several scenarios occur. One scenario may be when many legitimate users, who may be distributed widely across the network, request services (e.g., web page downloads) from the same resource (e.g., a web application server) or from a set of resources that are attached to the same subnet. For example, many legitimate users executing Internet application clients (e.g., web browsers) hosted by endpoints attached to networks 110-114 may request service from an Internet application server (e.g., a web application server) attached to network 115, during the same small time window. As the packets containing the requests traverse the Internet and converge on network 115 or the destination Internet application server, the volume of aggregate packet traffic may exceed the capacity of one or more network elements (e.g., routers, switches, network links, gateways, etc.) that are located close to, or immediately upstream from, the Internet application server. Finite packet queues contained in the various network elements may overflow, causing packets to be dropped. Accordingly one or more requests contained in the dropped packets may not be serviced by the Internet application server (e.g., the requesting users and applications may be denied service because of the overload condition).

It may also be the case that even if the incoming requests do not cause an overload condition, the volume of packets containing responses to the requests may cause an overload condition, for example, in the network elements located immediately downstream from the Internet application server. For example, this scenario may occur when the Internet application is asymmetric (e.g., when the average size, measured in bytes, of responses exceeds the average size of requests). Even though all of the requests may have been properly serviced by the Internet application server, some of the packets containing responses may have been dropped; thus, from the perspective of the service requestors, service may be denied because they may never receive responses to their requests.

In another scenario, the volume of requests may not cause an overload condition to occur in the network elements immediately upstream from the Internet application server; however, the Internet application server may not have the processing capacity to service all of the requests. For example, if the instantaneous rate of incoming requests exceeds the service rate of an Internet application server, the requests may be queued. If the state-of-excess is sustained for a sufficient duration of time, then the request queue may overflow, causing some requests to be dropped, thereby denying service to the users who issued the dropped requests.

Overload conditions may also be caused by one or more malicious agents. An overload condition that is caused by malicious agents may be a DoS attack. In a DoS attack, a logical network, or botnet, of malicious agents, or bots, may generate attack packet traffic when a so-called command-and-control agent directs the bots to launch an attack. Botnets may be created when an adversary is able to infect many endpoints distributed across the Internet with malware that implements the bot. Botnets may be composed of hundreds, thousands, or even millions of bots that have been identified on the Internet.

The network architecture of a DoS attack may be similar to the network architecture of an overload condition caused by legitimate users. For example, a botnet's bots may be hosted by one or more endpoints attached to networks 110-114. Upon direction from the botnet's command-and-control agent, the bots may send many service requests to an Internet application server attached to network 115. These malicious service requests or their associated responses may exceed the capacity of the network elements immediately upstream or downstream from the Internet application server, or the malicious service requests may exceed the capacity of the Internet application server. Accordingly, some legitimate users may be denied service.

Regardless of the cause of an overload condition, some users may require the Internet or one or more Internet applications be available for their use during the overload condition (e.g., that the services provided by the Internet or Internet application(s) not be denied to them). One approach to meeting this requirement may be to prevent packets from non-required users, agents, endpoints, and Internet applications from traversing the Internet and reaching their respective destinations, while simultaneously allowing packets from required users, agents, endpoints, and Internet applications to traverse the Internet and reach their respective destinations. In one embodiment such an approach may utilize one or more packet security gateways to discriminate between packets that should be allowed and packets that should be blocked.

Figure 2:
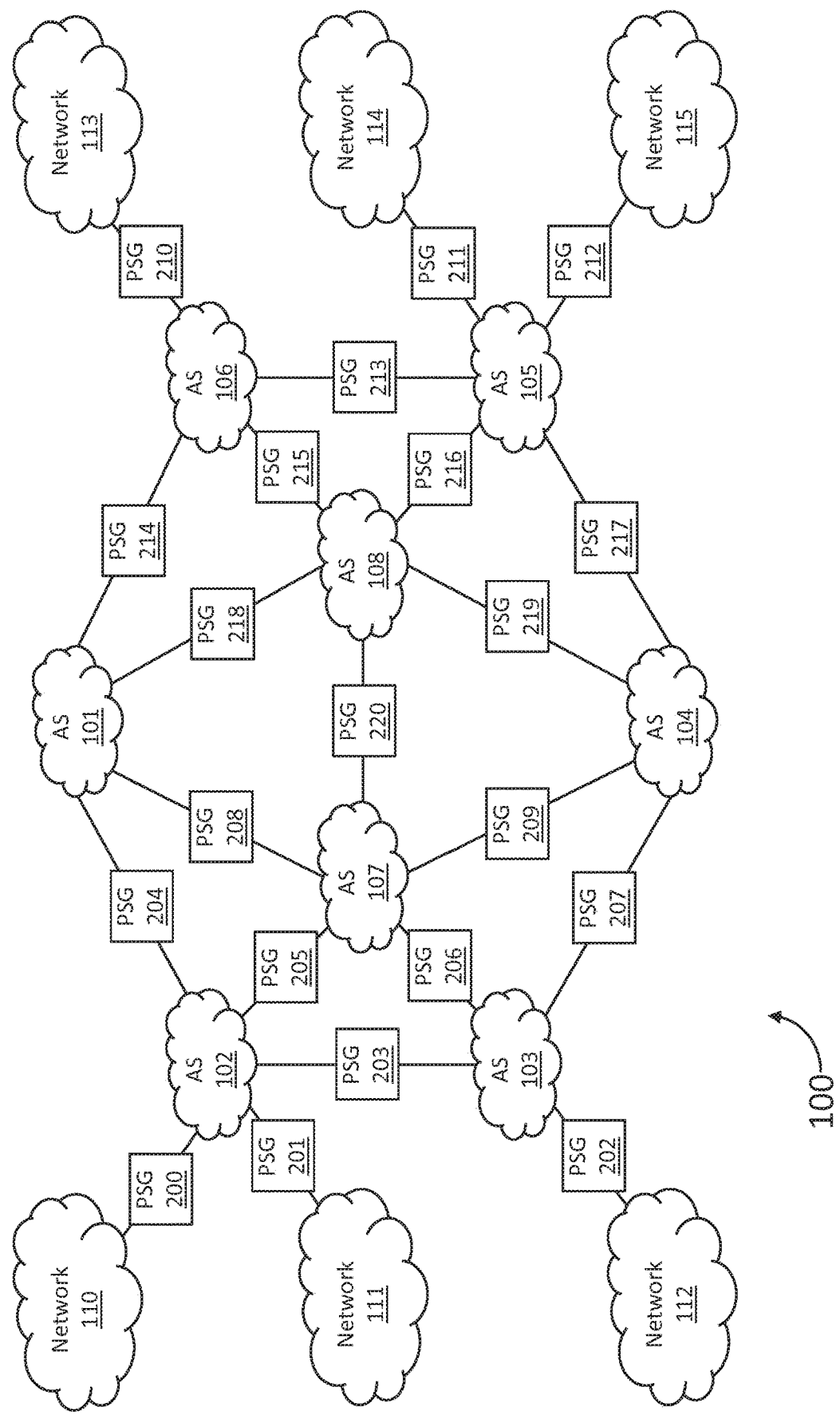
FIG. 2 illustrates an exemplary network environment with packet security gateways located at AS network boundaries such as peering points and subscriber Internet access points.

FIG. 2 illustrates an exemplary network environment with packet security gateways located at AS network boundaries such as peering points and subscriber Internet access points. Referring to FIG. 2, packet security gateways (PSGs) 200-220 may have been deployed in network environment 100 for the purpose of filtering required and non-required packets in such a way that during overload conditions, services may not be denied to certain users, agents, endpoints, or Internet applications. The packet security gateways me be located at the boundary points of AS networks 101-108 and subscriber networks 110-115 (e.g., at peering points and Internet access points). During an overload condition, one or more of packet security gateways 200-220 may enforce one or more policies (e.g., collections of packet filtering rules), which may determine which packet traffic is blocked and which packet traffic is allowed. The policies enforced by the packet security gateways may be changed over time in order to change the determination of which packet traffic is blocked and which packet traffic is allowed. For example, near the beginning of an overload condition, the scope of packet traffic being blocked or allowed, may be broad or narrow, respectively, in order to ensure that much of the traffic causing the overload condition is blocked, or to ensure that required communications are allowed and fully supported by the Internet or one or more associated Internet applications. Over time, as the sources of traffic causing overload conditions are identified and mitigated, or possibly decontaminated from malware applications such as bots, the policies may be changed to narrow the scope of packet traffic being blocked, or to broaden the scope of packet traffic being allowed.

When an overload condition is detected, a first set of policies may be enforced by packet security gateways 200-220 to mitigate the overload condition and ensure that some users, endpoints, or Internet applications are able to intercommunicate via network environment 100. Regardless of which users', endpoints', or Internet applications' Internet communications are supported by this first set of policies, there may be critical communications between network elements and systems that may need to be supported in order for the Internet or Internet applications to function properly. These critical communications may be allowed in the first set of policies and in all subsequent sets of policies. For example, these communications may include one or more of: BGP communications between peer BGP routers located at boundary points of ISP-operated AS networks and some subscriber networks; DNS protocol communications between Internet applications and DNS servers distributed across the Internet; and NTP communications between Internet elements, applications, or time servers distributed across the Internet. Additionally or alternatively, there may be other protocols that are considered critical; accordingly, a first set of policies may also support communications for these other protocols.

FIG. 3 illustrates an exemplary packet filtering policy which may be enforced by a packet security gateway located at a peering point. Referring to FIG. 3, policy 300 may contain one or more filtering rule representations. For example, packet security gateways may filter on five (5) fields in an IP packet: source and destination IP address fields, source and destination port fields (e.g., those contained in the encapsulated transport protocol packet, if any), and protocol (for IP version 4, as shown) or next header (for IP version 6, not shown). The five fields may be referred to as a "5-tuple". 5-tuple filtering rules may specify values for any number of the five fields (e.g., a filtering rule may only filter packets on a single field such as source IP address, or a filtering rule may filter on any combination of two, three, or four fields, or all five fields). Each rule may be associated with a packet handling action, which may be, for example, BLOCK (e.g., drop the packet) or ALLOW (e.g., forward the packet towards its destination).

The rules in policy 300 may allow certain BGP protocol communications, certain DNS protocol communications, and certain NTP protocol communications. Policy 300 may, for example, be enforced by a packet security gateway located at a peering point between two transit networks. For example, packet security gateway 220 may be located at a peering point between AS network 107 and AS network 108. A BGP router (not illustrated) may be located at each end of a network link connecting AS network 107 and AS network 108. An owner or operator of AS network 107 may assign IP version 4 address 123.56.89.0 to a network interface on the BGP router at the boundary of AS network 107, and an owner or operator of AS network 108 may assign IP version 4 address 87.65.21.0 to a network interface on the BGP router at the boundary of AS network 108. A network link may connect interface 123.56.89.0 to network interface 87.65.21.0. This network link may pass through packet security gateway 220, but as the network interfaces of packet security gateway 220 may not have IP addresses assigned to them, at the IP level, packet security gateway 220 may be transparent to the BGP routers.

Rule 1 301 of policy 300 may allow BGP packets sent by a BGP client from the network interface 123.56.89.0 and from any source port (as denoted by the "*" wildcard symbol) to network interface 87.65.21.0 and port 179, (e.g., a port associated with a BGP listener or BGP server). Rule 2 302 may allow BGP packets to be sent by a BGP client from the network interface 87.65.21.0 and from any source port to network interface 123.56.89.0 and port 179. Rule 3 303 and rule 4 304 may respectively allow packets containing responses to any requests or messages contained in packets allowed by rule 2 302 or rule 1 301 to be sent back to their requestors. BGP may use TCP as its transport protocol; accordingly, the protocol field value in rules 1-4 301-304 may be set to TCP.

Rule 5 305 and rule 6 306 may allow DNS protocol packets to pass through packet security gateway 220. Rules 5 305 and 6 306 may not include restrictions on the source IP addresses and destination IP addresses. For example, because DNS clients and DNS servers may be located in subscriber networks connected to the edge of network environment 100 (e.g., networks 110-115) packet filtering rules applied by a packet security gateway located at a peering point between two transit networks (e.g., packet security gateway 220 located between transit networks 107 and 108) may not have restrictions on the source and destination IP addresses of DNS protocol packets (e.g., because potentially any pair of DNS clients and servers could be communicating through the peering point). Rule 5 305 may allow packets that contain any DNS client's request and that are destined for any DNS server, which may be listening for requests on one or more ports (e.g., on port 53). Rule 6 306 may allow packets that contain DNS server responses to any requests contained in the packets allowed by rule 5 305. The DNS protocol may be transported using either TCP or the User Datagram Protocol (UDP); accordingly, the Protocol field in rule 5 305 and rule 6 306 may allow any value.

Rule 7 307 and rule 8 308 may allow NTP protocol packets to pass through packet security gateway 220. Similar to DNS, NTP clients and NTP servers may be located in subscriber networks connected to the edge of network environment 100 (e.g., networks 110-115); thus, packet filtering rules applied by a packet security gateway located at a peering point between two transit networks (e.g., packet security gateway 220 located between transit networks 107 and 108) may not have restrictions on the source and destination IP addresses of NTP protocol packets because potentially any pair of NTP clients and servers could be communicating through the peering point. Rule 7 307 may allow packets that contain any NTP client's request and that are destined for any NTP server, which may be listening for requests on one or more ports (e.g., 123). Rule 8 308 may allow packets that contain NTP server responses to any requests contained in the packets allowed by rule 7 307. NTP may use UDP as its transport protocol; accordingly, the Protocol field in rule 7 307 and rule 8 308 may be set to UDP.

Rule 9 309 may block any packet that does not match any of rules 1-8 301-308. For example, packet security gateway 220 may apply rules to packets in the order in which they appear in the policy that contains them. Accordingly, rule 9 309 may blocks packets that do not match any of rules 1-8

301-308 (e.g., one or more packets associated with the creation of an overload condition).

Policy 300 may be enforced by one or more packet security gateways at any peering point or Internet access point in network environment 100. In some embodiments, more restrictive rules may be contained in policies enforced by packet security gateways located near the edge of network environment 100 (e.g., at Internet access points). For example, to mitigate or even eliminate overload conditions at locations near the edge. In one type of DoS attack, known as an open DNS resolver attack, a botnet may cause many DNS servers to send packets to a target resource (e.g., a subscriber network's Internet access points or a company's public e-commerce web server) located at or near the edge of the Internet. Rule 5 305 and rule 6 306 of policy 300 may not block such packets. At an Internet access point, however, the IP addresses of the DNS clients and servers that are expected to be communicating across the Internet access point may be known to the operators of either the subscriber network or the ISP network connected by the Internet access point. Packet filtering rules that filter DNS protocol packets and that specify specific IP addresses of DNS endpoints in their source and destination IP address fields, may be enforced by packet security gateways located at Internet access points and may block most or all of the packets generated by an open DNS resolver attack, thereby mitigating or eliminating any overload conditions caused by such an attack.

FIG. 4 illustrates an exemplary packet filtering policy which may be enforced by a packet security gateway located at an Internet access point. Referencing FIG. 4, rules 10 401 and 11 402 may be contained in policy 400. Policy 400 may be enforced by packet security gateway 200, which may be located at an Internet access point between subscriber network 110 and AS network 102. Subscriber network 110 may have been allocated IP version 4 addresses with subnet prefix 32.10.87.0/24. DNS clients attached to network 110 may have all of their DNS requests routed to a DNS server with IP address 13.57.92.46, which may be external to network 110, and which may be considered to be trusted by the operators of network 110. Rule 10 401 may allow packets containing requests from DNS clients attached to network 110 and destined for port 53 on DNS server 13.57.92.46. Rule 11 402 may allow packets containing responses from DNS server 13.57.92.46 and destined for one or more DNS clients attached to network 110. Rule 12 403 may block any DNS server packets destined for network 110, as such packets may be part of an open DNS resolver attack, or may otherwise be packets from a DNS server that were not requested by a DNS client attached to network 110. In some embodiments, rule 12 403 may not be included in policy 400. For example, the last rule in the policy 400 may be a block rule like rule 9 309 in policy 300.

An overload condition may be highly mitigated or even eliminated by having packet security gateways 200-220 in network environment 100 enforce a first set of policies which is composed of policies similar to policy 300 and policy 400. This first set of policies may, however, also prevent one or more legitimate users or their Internet applications from communicating across network environment 100. For example, overload conditions may occur when there is a large DoS attack or many DoS attacks. Overload conditions may also occur when there is a widespread emergency condition that causes many legitimate users to attempt to access the same resources (e.g., a telephony system or news web site). While this first set of policies is being enforced, network operators may take actions to mitigate or eliminate the sources of packets that caused the original overload conditions. For example, network operators may prevent endpoints suspected of hosting bots from accessing the Internet or network operators may severely rate-limit some types of traffic that are believed to be causing the overload conditions.

It may be desirable or may be required by local laws or regulations that some users (e.g., first responders) be guaranteed services from the Internet or from certain Internet applications, despite the overload conditions. To provide such guarantees, a second set of policies may be enforced by one or more of packet security gateways 200-220 in network environment 100. These policies may contain all of the rules contained in the first set of policies and one or more additional rules that allow certain users (e.g., first responders) or certain Internet applications to communicate over network environment 100.

For example, all users with endpoints attached to network 110 and all users with endpoints attached to network 112 may be allowed to communicate, using the HTTP protocol, with web application servers attached to network 113. Network 110 may have been allocated IP version 4 addresses with subnet prefix 10.10.87.0/24. Network 112 may have been allocated IP addresses with subnet prefix 12.12.87.0/24, and network 113 may have been allocated IP addresses with subnet prefix 13.13.87.0/24.

FIG. 5 illustrates an exemplary packet filtering policy which may be enforced by a packet security gateway, and which may allow certain users or certain Internet applications to communicate. Referring to FIG. 5, policy 500 may include one or more of the rules from policy 300 or policy 400. Policy 500 may also contain rules 13-16 501-504. Rule 13 501 may allow packets sourced from HTTP clients (e.g., web browsers) attached to network 110 and destined for one or more HTTP servers (e.g., one or more web application servers on port 80) attached to network 113. Rule 14 502 may allow packets sourced by the HTTP servers attached to network 113 and destined for endpoints attached to network 110. Such packets may, for example, contain responses to HTTP requests issued by HTTP clients attached to network 110. Rule 15 503 and rule 16 504 may be similar to rule 13 501 and rule 14 502 except they may allow packets containing HTTP client requests and HTTP server responses between networks 112 and 113.

An overload condition may be highly mitigated or even eliminated, and certain users or certain Internet applications may be allowed to communicate over network environment 100, by having packet security gateways 200-220 in network environment 100 enforce a second set of policies which is composed of policies similar to policy 500. While this second set of policies is being enforced, network operators may take actions to mitigate or eliminate the sources of packets that caused the original overload conditions.

Later, a third set of policies may be enforced by packet security gateways 200-220 in network environment 100 which may contain all of the rules contained in the second set of policies (which may themselves have contained all of the rules contained in the first set of policies) and may also contain one or more additional rules that allow more users and/or more Internet applications to communicate over network environment 100. While the third set of policies is being enforced, network operators may take further actions to mitigate or eliminate sources of packets that caused the overload conditions. Later, a fourth set of policies may be enforced that incorporates the third set of policies and broadens the scope of user and/or Internet applications that may communicate over network environment 100. Such a cycle may be repeated until the normal operation of one or more of network environment 100, its users, or its Internet applications, is restored, or the sources of traffic which caused the original overload conditions are sufficiently mitigated or eliminated such that users and Internet applications are not denied service because of overload conditions.

In some embodiments, packet security gateways may be required to be located at all peering points or Internet access points in network environment 100. In other embodiments, this practice may be relaxed while still providing protection from overload conditions and while still providing some users and Internet applications with communications services. For example, an individual ISP may be able to offer protection from overload conditions and still support selected communications for its subscribers.

Figure 6:
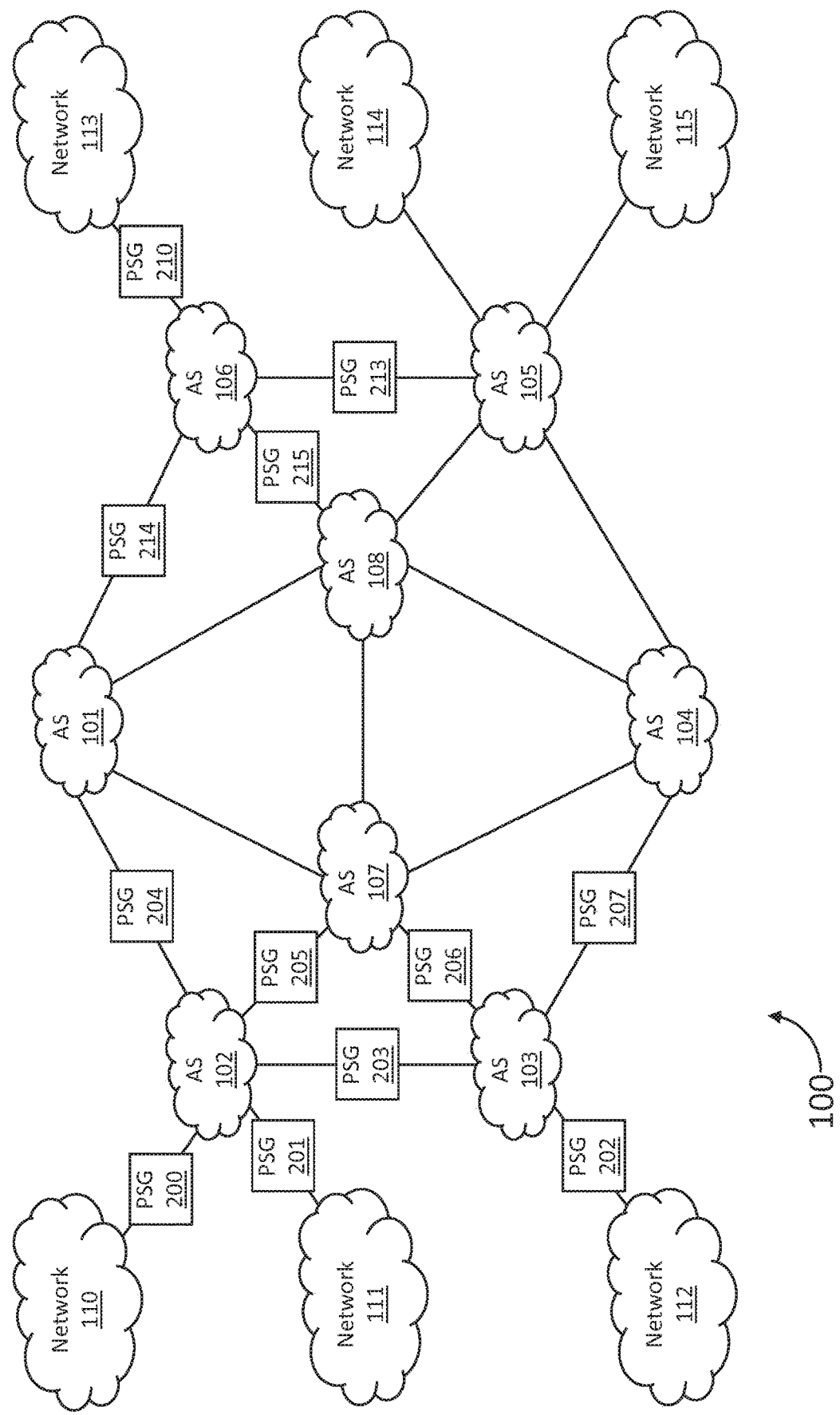
FIG. 6 illustrates an exemplary network environment with packet security gateways located at AS network boundaries, such as peering points and subscriber Internet access points, of an individual ISP that provides protections to its subscribers.

FIG. 6 illustrates an exemplary network environment with packet security gateways located at AS network boundaries, such as peering points and subscriber Internet access points, of an individual ISP that provides protections to its subscribers. Referring to FIG. 6, an ISP (e.g., SecureISP) may own or operate AS networks 102, 103, and 106 in network environment 100. SecureISP may have located packet security gateways (e.g., packet security gateways 200-207, 210, 213, 214, and 215) at all the peering points and Internet access points of its networks. One or more other ISPs that own or operate AS networks 101, 104, 105, 107, and 108 may not have installed packet security gateways at peering points and Internet access points of their networks.

An overload condition may occur in network 113, which may be owned or operated by a subscriber to SecureISP. By enforcing one or more policies similar to policy 300 at its peering points and by enforcing policies similar to policy 400 at its Internet access points, SecureISP may eliminate or highly mitigate the overload condition in network 113. For example, regardless of the source of the packet traffic that caused the overload condition (e.g., any combination of endpoints attached to networks 110, 111, 112, 114, and 115), the traffic may be filtered by a policy included in the first set of policies because the traffic may be required to attempt to pass through one of the packet security gateways operated by SecureISP while being routed towards network 113. While the first set of policies is being enforced, SecureISP may take actions to mitigate or eliminate one or more sources of the traffic causing the overload condition. For example, SecureISP may take actions to mitigate or eliminate one or more sources of traffic that are attached to its subscribers' networks.

Later, after enforcing the first set of policies, SecureISP may want to allow all users with endpoints attached to its subscriber's network 110 and all users with endpoints attached to its subscriber's network 112 to communicate, using the HTTP protocol, with web application servers attached to its subscriber's network 113. Network 110 may have been allocated IP version 4 addresses with subnet prefix 10.10.87.0/24. Network 112 may have been allocated IP addresses with subnet prefix 12.12.87.0/24. Network 113 may have been allocated IP addresses with subnet prefix 13.13.87.0/24. By enforcing a second set of policies similar to policy 500 at its peering points and its Internet access points, SecureISP may eliminate or highly mitigate the overload condition in network 113 while allowing HTTP clients (e.g., web browsers) attached to its subscribers' networks 110 and 112 to communicate with HTTP servers (e.g., web application servers) attached to its subscriber's network 113.

Depending on the routing polices being used in network environment 100, packet traffic generated by HTTP clients and HTTP servers attached to networks 110, 112, and 113 may be required to traverse one or more of AS networks 101, 104, 105, 107, and 108, which may not have packet security gateways located at their peering points and Internet access points. Packet traffic generated by HTTP clients and HTTP servers attached to networks 110, 112, and 113 may traverse AS networks which may also be transporting traffic that may be causing overload conditions at various subscriber networks 110-115. Given the architecture, operation, and behavior of network environment 100, it may be unlikely that any one or more of AS networks 101, 104, 105, 107, and 108 are themselves experiencing overload conditions that may disrupt communications between HTTP clients and HTTP servers attached to networks 110, 112, and 113. Accordingly, SecureISP may be able to offer effective protections from overload conditions to its subscribers, even though other ISPs may not offer similar protections and may transport some or most of the traffic that may be causing overload conditions in SecureISP's subcribers' networks.

Figure 7:
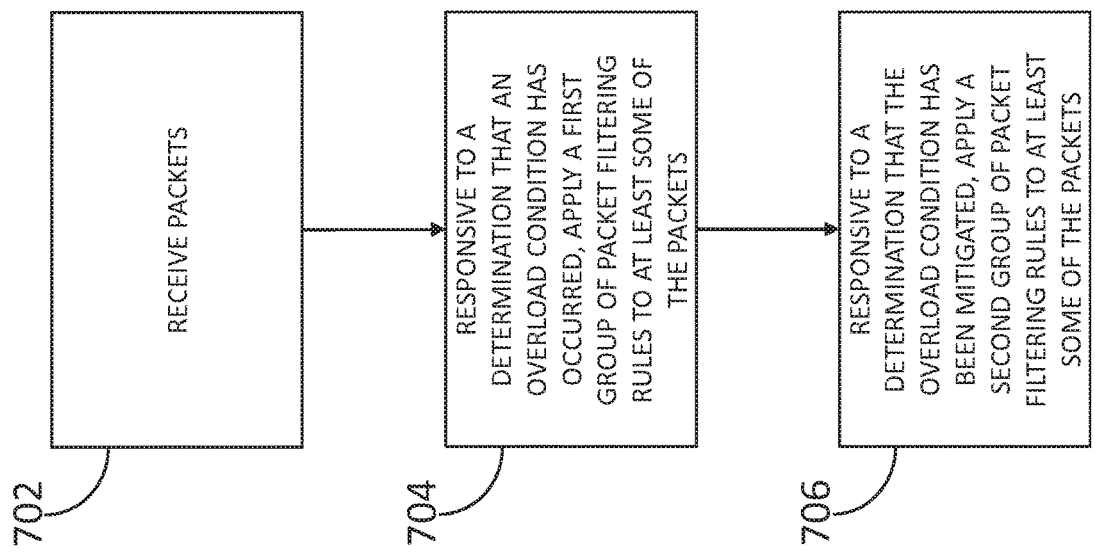
FIG. 7 illustrates an exemplary method for protecting a network from overload conditions while allowing certain users and Internet applications to communicate across the network.

FIG. 7 illustrates an exemplary method for protecting a network from overload conditions while allowing certain users and Internet applications to communicate across the network. Referring to FIG. 7, at step 702, packets may be received. For example, packet security gateway 200 may receive packets from network 110. At step 704, responsive to a determination that an overload condition has occurred, a first group of packet filtering rules may be applied to at least some of the packets. For example, an overload condition may occur in network 113, and responsive to a determination that the overload condition in network 113 has occurred, packet security gateway 200 may apply one or more of rules 1-9 301-309 of policy 300 to at least some of the packets received from network 110. At step 706, responsive to a determination that the overload condition has been mitigated, a second group of packet filtering rules may be applied to at least some of the packets. For example, responsive to a determination that the overload condition in network 113 has been mitigated, packet security gateway 200 may apply one of more of rules 13-16 501-504 to at least some of the packets received from network 110.

Figure 8:
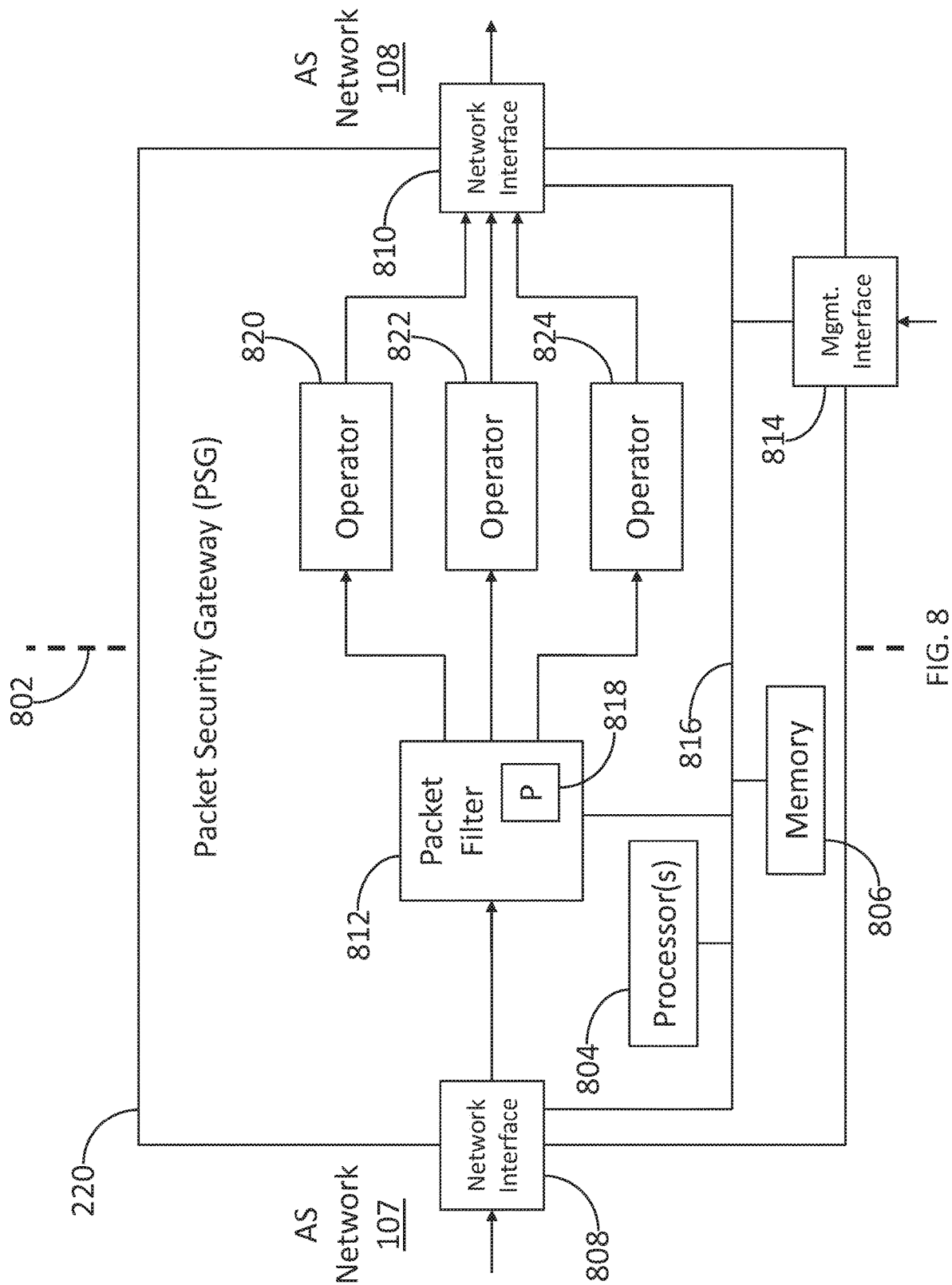
FIG. 8 illustrates an exemplary packet security gateway.

FIG. 8 illustrates an exemplary packet security gateway. Referring to FIG. 8, as indicated above, packet security gateway 220 may be located between AS networks 107 and 108. For example, packet security gateway 220 may be located at network boundary 802. Packet security gateway 220 may include one or more processors 804, memory 806, network interfaces 808 and 810, packet filter 812, and management interface 814. Processor(s) 804, memory 806, network interfaces 808 and 810, packet filter 812, and management interface 814 may be interconnected via data bus 816. Network interface 808 may connect packet security gateway 220 to AS network 107. Similarly, network interface 810 may connect packet security gateway 220 to AS network 108. Memory 806 may include one or more program modules that when executed by processor(s) 804, may configure packet security gateway 220 to perform one or more of various functions described herein.

Packet security gateway 220 may be configured to receive a policy (e.g., one or more of policies 300, 400, or 500) from one or more security policy management servers (not illustrated). For example, packet security gateway 220 may receive policy 818 from a security policy management server via management interface 814 (e.g., via out-of-band signaling) or network interface 808 (e.g., via in-band signaling). Packet security gateway 220 may include one or more packet filters or packet discriminators, or logic for implementing one or more packet filters or packet discriminators. For example, packet security gateway 220 may include packet filter 812, which may be configured to examine information associated with packets received by packet security gateway 220 and forward such packets to one or more of operators 820, 822, or 824 based on the examined information. For example, packet filter 812 may examine information associated with packets received by packet security gateway 220 (e.g., packets received from AS network 107 via network interface 808) and forward the packets to one or more of operators 820, 822, or 824 based on the examined information.

Policy 818 may include one or more rules and the configuration of packet filter 812 may be based on one or more of the rules included in policy 818. For example, policy 818 may include one or more rules specifying that packets having specified information should be forwarded to operator 820, that packets having different specified information should be forwarded to operator 822, and that all other packets should be forwarded to operator 824. Operators 820, 822, and 824 may be configured to perform one or more functions on packets they receive from packet filter 812. For example, one or more of operators 820, 822, or 824 may be configured to forward packets received from packet filter 812 into AS network 108, forward packets received from packet filter 812 to an IPsec stack (not illustrated) having an IPsec security association corresponding to the packets, or drop packets received from packet filter 812. In some embodiments, one or more of operators 820, 822, or 824 may be configured to drop packets by sending the packets to a local "infinite sink" (e.g., the/dev/null device file in a UNIX/LINUX system).

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing servers and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

The invention claimed is:

1. A method comprising:
receiving, by a packet-filtering device located at an internet access point, a first group of packet filtering rules and a second group of packet filtering rules, wherein:
the first group of packet filtering rules comprise rules for handling network traffic associated with one or more applications originating from a first group of users during a cyber attack; and
the second group of packet filtering rules comprise rules for handling network traffic associated with the one or more applications originating from a second group of users during the cyber attack;
receiving an indication that a first cyber attack is occurring on a first network;
receiving, via the first network and during the first cyber attack, a plurality of packets;
determining that a first subset of the plurality of packets originated from the first group of users;
applying, based on a determination that the first subset of the plurality of packets originated from the first group of users, the first group of packet filtering rules to the first subset of the plurality of packets during the first cyber attack, wherein the first group of packet filtering rules comprises allowing the first subset of the plurality of packets to access the one or more applications hosted on one or more application servers connected to the first network;
determining that a second subset of the plurality of packets originated from the second group of users; and
applying, based on a determination that the second subset of the plurality of packets originated from the second group of users, the second group of packet filtering rules to the second subset of the plurality of packets during the first cyber attack, wherein the second group of packet filtering rules comprises preventing the second subset of the plurality of packets from accessing the one or more applications hosted on the one or more application servers connected to the first network.

2. The method of claim 1, wherein the receiving the first group of packet filtering rules and the second group of packet filtering rules comprises:
receiving the first group of packet filtering rules and the second group of packet filtering rules via a management network, wherein the management network is out-of-band relative to the first network.

3. The method of claim 1, wherein the one or more applications comprise at least one of:
telephony;
messaging;
e-mail; or
web.

4. The method of claim 1, wherein the first group of users is associated with one or more emergency services.

5. The method of claim 1, further comprising:
receiving, by the packet-filtering device located at the internet access point and based on a determination that the first cyber attack has been mitigated to a first degree, a third group of packet filtering rules; and
applying the third group of packet filtering rules to the second subset of the plurality of packets, wherein the third group of packet filtering rules comprises allowing a first portion of the second subset of the plurality of packets to access the one or more applications hosted on the one or more application servers.

6. The method of claim 1, further comprising:
determining that a portion of the first subset of packets comprises gateway protocol data; and
applying, based on a determination that at least one of the first group of packet filtering rules applies to the gateway protocol data, the first group of packet filtering rules to the portion of the first subset of packets, wherein the first group of packet filtering rules comprises allowing the portion of the first subset of packets to continue toward its destination.

7. The method of claim 1, further comprising:
determining that a portion of the first subset of packets comprises domain name system (DNS) data; and
applying, based on a determination that at least one of the first group of packet filtering rules applies to DNS data, the first group of packet filtering rules to the portion of the first subset of packets, wherein the first group of packet filtering rules comprises allowing the portion of the first subset of packets to continue toward its destination.

8. The method of claim 1, further comprising:
determining that a portion of the first subset of packets comprises network time protocol (NTP) data; and
applying, based on a determination that at least one of the first group of packet filtering rules applies to NTP data, the first group of packet filtering rules to the portion of the first subset of packets, wherein the first group of packet filtering rules comprises allowing the portion of the first subset of packets to continue toward its destination.

9. The method of claim 1, wherein the first cyber attack comprises a denial of service attack.

10. A packet filtering device, located at an internet access point, comprising:
one or more processors; and
memory storing instructions that, when executed by the one or more processors, cause the packet filtering device to:
receive a first group of packet filtering rules and a second group of packet filtering rules, wherein:
the first group of packet filtering rules comprise rules for handling network traffic associated with one or more applications originating from a first group of users during a cyber attack; and
the second group of packet filtering rules comprise rules for handling network traffic associated with the one or more applications originating from a second group of users during the cyber attack;
receiving an indication that a first cyber attack is occurring on a first network;
receiving, via the first network and during the first cyber attack, a plurality of packets;
determine that a first subset of the plurality of packets originated from the first group of users;
apply, based on a determination that the first subset of the plurality of packets originated from the first group of users, the first group of packet filtering rules to the first subset of the plurality of packets during the first cyber attack, wherein the first group of packet filtering rules comprises allowing the first subset of the plurality of packets to access the one or more applications hosted on one or more application servers connected to the first network;
determine that a second subset of the plurality of packets originated from the second group of users; and
apply, based on a determination that the second subset of the plurality of packets originated from the second group of users, the second group of packet filtering rules to the second subset of the plurality of packets during the first cyber attack, wherein the second group of packet filtering rules comprises preventing the second subset of the plurality of packets from accessing the one or more applications hosted on the one or more application servers connected to the first network.

11. The packet filtering device of claim 10, wherein the instructions, when executed by the one or more processors, cause the packet filtering device to:
receive the first group of packet filtering rules and the second group of packet filtering rules via a management network, wherein the management network is out-of-band relative to the first network.

12. The packet filtering device of claim 10, wherein the one or more applications comprise at least one of:
telephony;
messaging;
e-mail; or
web.

13. The packet filtering device of claim 10, wherein the first group of users is associated with one or more emergency services.

14. The packet filtering device of claim 10, wherein the instructions, when executed by the one or more processors, cause the packet filtering device to:
receive, based on a determination that the first cyber attack has been mitigated to a first degree, a third group of packet filtering rules; and
apply the third group of packet filtering rules to the second subset of the plurality of packets, wherein the third group of packet filtering rules comprises allowing a first portion of the second subset of the plurality of packets to access the one or more applications hosted on the one or more application servers.

15. The packet filtering device of claim 10, wherein the instructions, when executed by the one or more processors, cause the packet filtering device to:
determine that a portion of the first subset of packets comprises gateway protocol data; and
apply, based on a determination that at least one of the first group of packet filtering rules applies to the gateway protocol data, the first group of packet filtering rules to the portion of the first subset of packets, wherein the first group of packet filtering rules comprises allowing the portion of the first subset of packets to continue toward its destination.

16. The packet filtering device of claim 10, wherein the instructions, when executed by the one or more processors, cause the packet filtering device to:
determine that a portion of the first subset of packets comprises domain name system (DNS) data; and
apply, based on a determination that at least one of the first group of packet filtering rules applies to DNS data, the first group of packet filtering rules to the portion of the first subset of packets, wherein the first group of packet filtering rules comprises allowing the portion of the first subset of packets to continue toward its destination.

17. The packet filtering device of claim 10, wherein the instructions, when executed by the one or more processors, cause the packet filtering device to:
determine that a portion of the first subset of packets comprises network time protocol (NTP) data; and
apply, based on a determination that at least one of the first group of packet filtering rules applies to NTP data, the first group of packet filtering rules to the portion of the first subset of packets, wherein the first group of packet filtering rules comprises allowing the portion of the first subset of packets to continue toward its destination.

18. The packet filtering device of claim 10, wherein the first cyber attack comprises a denial of service attack.

19. A non-transitory computer-readable medium comprising instructions that, when executed, configure a packet-filtering device, located at an internet access point, to:
receive a first group of packet filtering rules and a second group of packet filtering rules, wherein:
the first group of packet filtering rules comprise rules for handling network traffic associated with one or more applications originating from a first group of users during a cyber attack; and
the second group of packet filtering rules comprise rules for handling network traffic associated with the one or more applications originating from a second group of users during the cyber attack;
receiving an indication that a first cyber attack is occurring on a first network;
receiving, via the first network and during the first cyber attack, a plurality of packets;
determine that a first subset of the plurality of packets originated from the first group of users;
apply, based on a determination that the first subset of the plurality of packets originated from the first group of users, the first group of packet filtering rules to the first subset of the plurality of packets during the first cyber attack, wherein the first group of packet filtering rules comprises allowing the first subset of the plurality of packets to access the one or more applications hosted on one or more application servers connected to the first network;
determine that a second subset of the plurality of packets originated from the second group of users; and
apply, based on a determination that the second subset of the plurality of packets originated from the second group of users, the second group of packet filtering rules to the second subset of the plurality of packets during the first cyber attack, wherein the second group of packet filtering rules comprises preventing the second subset of the plurality of packets from accessing the one or more applications hosted on the one or more application servers connected to the first network.

20. The non-transitory computer-readable medium of claim 19, wherein the instructions, when executed, configure the packet-filtering device to:
receive the first group of packet filtering rules and the second group of packet filtering rules via a management network, wherein the management network is out-of-band relative to the first network.

21. The non-transitory computer-readable medium of claim 19, wherein the one or more applications comprise at least one of:
telephony;
messaging;
e-mail; or
web.

22. The non-transitory computer-readable medium of claim 19, wherein the first group of users is associated with one or more emergency services.

23. The non-transitory computer-readable medium of claim 19, wherein the instructions, when executed, configure the packet-filtering device to:
receive, based on a determination that the first cyber attack has been mitigated to a first degree, a third group of packet filtering rules; and
apply the third group of packet filtering rules to the second subset of the plurality of packets, wherein the third group of packet filtering rules comprises allowing a first portion of the second subset of the plurality of packets to access the one or more applications hosted on the one or more application servers.

24. The non-transitory computer-readable medium of claim 19, wherein the instructions, when executed, configure the packet-filtering device to:
determine that a portion of the first subset of packets comprises gateway protocol data; and
apply, based on a determination that at least one of the first group of packet filtering rules applies to the gateway protocol data, the first group of packet filtering rules to the portion of the first subset of packets, wherein the first group of packet filtering rules comprises allowing the portion of the first subset of packets to continue toward its destination.

25. The non-transitory computer-readable medium of claim 19, wherein the instructions, when executed, configure the packet-filtering device to:
determine that a portion of the first subset of packets comprises domain name system (DNS) data; and
apply, based on a determination that at least one of the first group of packet filtering rules applies to DNS data, the first group of packet filtering rules to the portion of the first subset of packets, wherein the first group of packet filtering rules comprises allowing the portion of the first subset of packets to continue toward its destination.

26. The non-transitory computer-readable medium of claim 19, wherein the instructions, when executed, configure the packet-filtering device to:
determine that a portion of the first subset of packets comprises network time protocol (NTP) data; and
apply, based on a determination that at least one of the first group of packet filtering rules applies to NTP data, the first group of packet filtering rules to the portion of the first subset of packets, wherein the first group of packet filtering rules comprises allowing the portion of the first subset of packets to continue toward its destination.

27. The non-transitory computer-readable medium of claim 19, wherein the first cyber attack comprises a denial of service attack.

* * * * *

UNITED STATES PATENT AND TRADEMARK OFFICE
CERTIFICATE OF CORRECTION

PATENT NO. : 11,496,497 B2
APPLICATION NO. : 17/089911
DATED : November 8, 2022
INVENTOR(S) : Sean Moore et al.

It is certified that error appears in the above-identified patent and that said Letters Patent is hereby corrected as shown below:

On the Title Page

Page 6, Column 1, item (56) Other Publications, Line 5:
Delete "Reporton" and insert --Report on--

Page 6, Column 1, item (56) Other Publications, Line 65:
Delete "Softward" and insert --Software--

Page 6, Column 2, item (56) Other Publications, Line 46:
Delete "Staurt" and insert --Stuart--

Page 7, Column 1, item (56) Other Publications, Line 20:
Delete "Aug. 1, 2019" and insert --Aug. 19, 2019--

Signed and Sealed this
Seventh Day of March, 2023

Katherine Kelly Vidal
*Director of the United States Patent and Trademark Office*